(12) United States Patent
Colena et al.

(10) Patent No.: US 11,797,951 B2
(45) Date of Patent: Oct. 24, 2023

(54) USING CONSTRAINT PROGRAMMING TO OBTAIN A MACHINE MAINTENANCE SCHEDULE FOR MAINTENANCE TASKS

(71) Applicant: Oracle International Corporation, Redwood Shores, CA (US)

(72) Inventors: Michael Patrick Colena, Hollis, NH (US); Joshua Deen Griffin, Wexford, PA (US); Gao Chen, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 589 days.

(21) Appl. No.: 16/938,290

(22) Filed: Jul. 24, 2020

(65) Prior Publication Data
US 2022/0027861 A1    Jan. 27, 2022

(51) Int. Cl.
*G06Q 10/00*    (2023.01)
*G06Q 10/06*    (2023.01)
(Continued)

(52) U.S. Cl.
CPC ....... *G06Q 10/20* (2013.01); *G06Q 10/06312* (2013.01); *G06Q 10/06313* (2013.01); *G06Q 10/1097* (2013.01)

(58) Field of Classification Search
CPC ............. G06Q 10/20; G06Q 10/06312; G06Q 10/06313; G06Q 10/1097; Y02P 90/80
(Continued)

(56) References Cited

U.S. PATENT DOCUMENTS 6,662,167 B1    12/2003    Xiao
7,092,894 B1    8/2006    Crone
(Continued)

FOREIGN PATENT DOCUMENTS

CN    102331758 A    *    1/2012    ............. G05B 15/02
CN    102331759 A    *    1/2012    ............. F01K 13/02
(Continued)

OTHER PUBLICATIONS

Jan Lange, "Scheduling Preventive Maintenance Tasks With Synchronization Constraints for Human Resources by a CP Modeling Approach," 2014, Proceedings of the 2014 Winter Simulation Conference, pp. 2454-2465. (Year: 2014).*
(Continued)

*Primary Examiner* — Tan D Nguyen
(74) *Attorney, Agent, or Firm* — Invoke

(57) ABSTRACT

Information about a set of maintenance tasks and time windows includes a cost value per task per time window. Based on the information, a data model generator generates a data model, including task elements; time elements; cost elements; a total cost element; a constraint that requires each task element be assigned a time window from a respective domain, such that each time element is assigned a task count from a respective domain; a constraint that requires each cost element be assigned a cost value associated with a time window assigned (or to be assigned) to a task element corresponding to the cost element; and a constraint that requires the total cost element be assigned a total cost value that is a sum of the cost values assigned (or to be assigned) to the cost elements. Based on the data model, a CP solver determines a proposed maintenance schedule.

24 Claims, 11 Drawing Sheets

(51) Int. Cl.
  *G06Q 10/10* (2023.01)
  *G06Q 10/20* (2023.01)
  *G06Q 10/0631* (2023.01)
  *G06Q 10/1093* (2023.01)

(58) Field of Classification Search
  USPC ........................................................ 705/305
  See application file for complete search history.

(56) References Cited

U.S. PATENT DOCUMENTS

| | | | |
|---|---|---|---|
| 7,447,669 | B2 | 11/2008 | Zhu |
| 7,991,633 | B2 | 8/2011 | Baker et al. |
| 8,560,368 | B1 | 10/2013 | Maity et al. |
| 8,583,467 | B1 | 11/2013 | Morris et al. |
| 8,869,165 | B2 | 10/2014 | Dasgupta et al. |
| 9,659,253 | B1* | 5/2017 | Ghaddar ............... G06N 5/01 |
| 9,846,589 | B2* | 12/2017 | Udupi ............... G06F 9/45558 |
| 2002/0049563 | A1 | 4/2002 | Vetter et al. |
| 2003/0055666 | A1 | 3/2003 | Roddy et al. |
| 2004/0267679 | A1* | 12/2004 | Fromherz ............... G06N 5/01 |
| | | | 706/19 |
| 2005/0187721 | A1 | 8/2005 | Baust et al. |
| 2005/0222827 | A1* | 10/2005 | Emek ................... G06N 20/00 |
| | | | 703/2 |
| 2007/0011035 | A1 | 1/2007 | Yaffe |
| 2008/0288321 | A1 | 11/2008 | Dillon et al. |
| 2011/0029984 | A1 | 2/2011 | Norman et al. |
| 2012/0017216 | A1 | 1/2012 | Chan et al. |
| 2012/0110584 | A1 | 5/2012 | Chaudhry et al. |
| 2013/0091495 | A1* | 4/2013 | Garg ................... G06F 11/3684 |
| | | | 717/131 |
| 2013/0326485 | A1* | 12/2013 | Ghosh ................... G06F 8/313 |
| | | | 717/126 |
| 2014/0142998 | A1 | 5/2014 | Kroeger et al. |
| 2017/0091688 | A1 | 3/2017 | Lopes et al. |
| 2019/0080615 | A1 | 3/2019 | Small et al. |
| 2020/0019935 | A1 | 1/2020 | Jan et al. |

FOREIGN PATENT DOCUMENTS

| | | | | |
|---|---|---|---|---|
| CN | 109409600 A | * | 3/2019 | ............ G06Q 10/04 |
| WO | WO-2017181628 A1 | * | 10/2017 | |
| WO | WO-2018067375 A1 | * | 4/2018 | ............ G06Q 10/02 |

OTHER PUBLICATIONS

Xiaodong Yao, "Optimal Preventive Maintenance Scheduling in Semiconductor Manufacturing", 2004, IEEE Transactions on Semiconductor Manufacturing, vol. 17, No. 3, pp. 345-356. (Year: 2004).*
Christopher Varnier, "Scheduling Predictive Maintenance in Flowshop," 2012, IEEE, pp. 1-6. (Year: 2012).*
Brucker et al., "Resource-Constrained Project Scheduling and Timetabling", 2001, pp. 277-293.
Elkhyari et al., "Constraint Programming for Dynamic Scheduling Problems", May 2004, 6 pages.
Frost et al., "Constraint Processing for Optimal Maintenance Scheduling", An Electric Power Research Institute final report, Feb. 1998, pp. 1-40.
Hladik et al., "Dynamic Constraint Programming for Solving Hard Real-Time Allocation Problems", Jan. 2015, pp. 1-19.
Junker et al., "Preference-based Search for Minimizing Changes in Rescheduling Problems". In: IJCAI-99 Workshop on scheduling and planning meet real-time: Monitoring in a dynamic and uncertain world, 1999, pp. 39-45.
Krogt et al., "Scheduling in the Real World: Lessons Learnt", 2009, 7 pages.
Lindgren et al., "Improving the Maintenance Planning of Heavy Trucks using Constraint Programming", 2013, 17 pages.
Milano et al., "Constraint Programming", Contributi Scientific, 2006, 6 pages.
Muller et al., "Minimal Perturbation Problem in Course Timetabling", 2005. pp. 126-146.
Peng et al., "A Constraint Programming Method for Advanced Planning and Scheduling System with Multilevel Structured Products," Hindawi Publishing Corp., vol. 24, Article ID 917685, 7 pages.
Smith, "A Tutorial on Constraint Programming", School of Computer Studies Research Report Series, University of Leeds, Report 95.14, Apr. 1995, 22 pages.

* cited by examiner

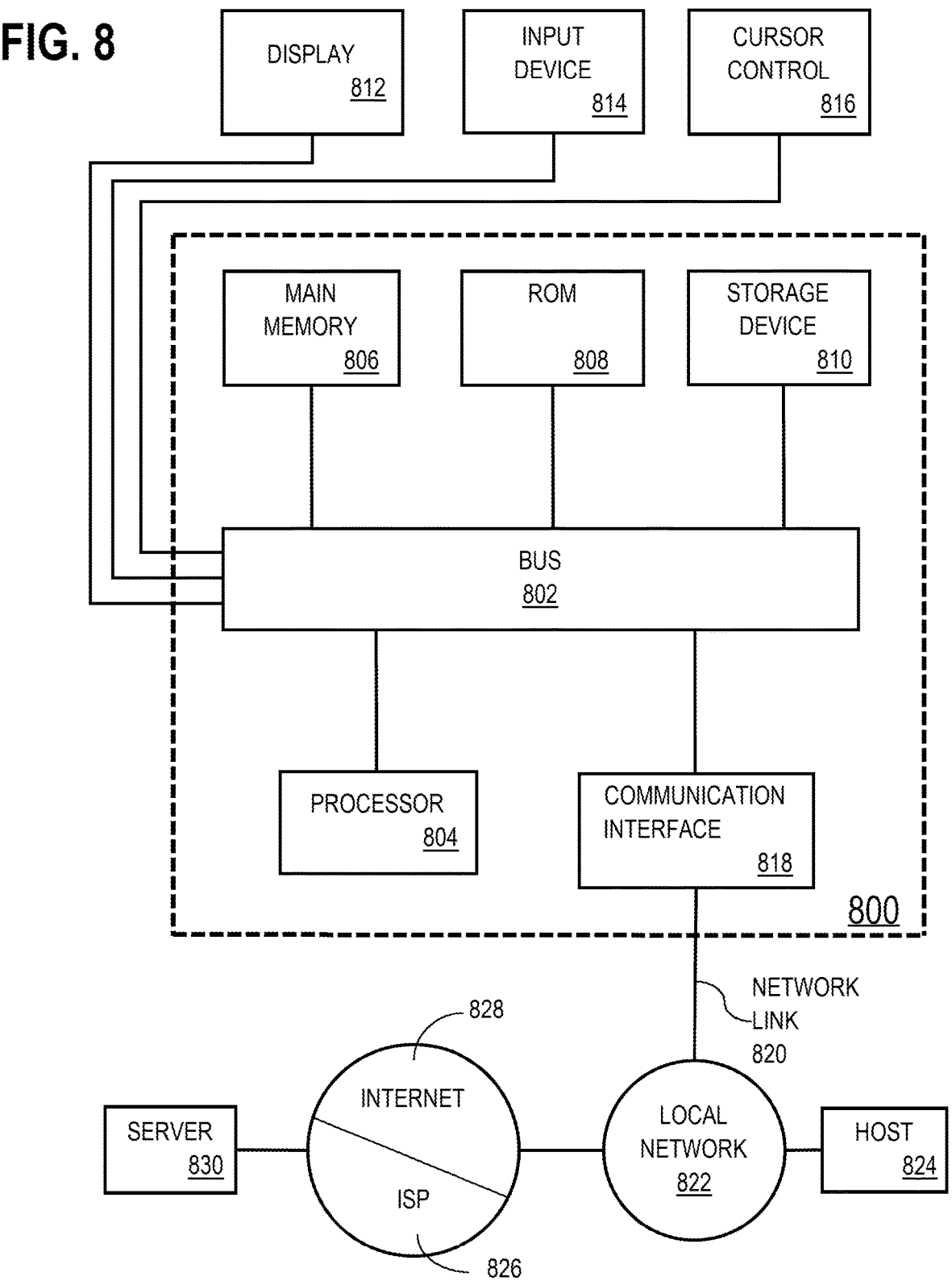

USING CONSTRAINT PROGRAMMING TO OBTAIN A MACHINE MAINTENANCE SCHEDULE FOR MAINTENANCE TASKS

INCORPORATION BY REFERENCE; DISCLAIMER

The following applications are hereby incorporated by reference: U.S. Provisional Patent Application No. 62/723,945 filed on Aug. 28, 2018; and U.S. Non-Provisional patent application Ser. No. 16/405,638 filed on May 7, 2019. The Applicant hereby rescinds any disclaimer of claim scope in the parent applications or the prosecution history thereof and advises the USPTO that the claims in this application may be broader than any claim in the parent applications.

TECHNICAL FIELD

The present disclosure relates to the use of constraint programming. In particular, the present disclosure relates to using constraint programming to obtain a machine maintenance schedule for maintenance tasks.

BACKGROUND

A machine is a hardware apparatus configured to perform one or more functions. Examples of machines include factory machines (such as manufacturing machines), trucks, and computing devices.

A machine generally needs maintenance service from time to time in order to maintain the machine's operation and/or efficiency. A machine may be associated with a default maintenance schedule that is specified by a machine manual and/or a machine manufacturer. However, the actual maintenance needs of a machine may change depending on various factors, such as actual usage duration, actual production levels, operating conditions, and/or operating errors.

If a machine is maintained based on a default maintenance schedule, rather than the machine's actual maintenance needs, the machine may fail before a necessary maintenance task is performed. The machine's failure may require additional resources to be repaired, thereby resulting in prolonged downtime. Additionally, the machine's failure may be an unexpected interruption of the machine's functions, causing ripple effects in the production chain.

Moreover, if a machine is maintained based on a default machine schedule, the machine may be serviced even though the machine's risk of failure is very low. Performing unnecessary maintenance results in unnecessary downtime for the machine.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 8 shows a block diagram that illustrates a computer system in accordance with one or more embodiments.

DETAILED DESCRIPTION

Figure 1A:
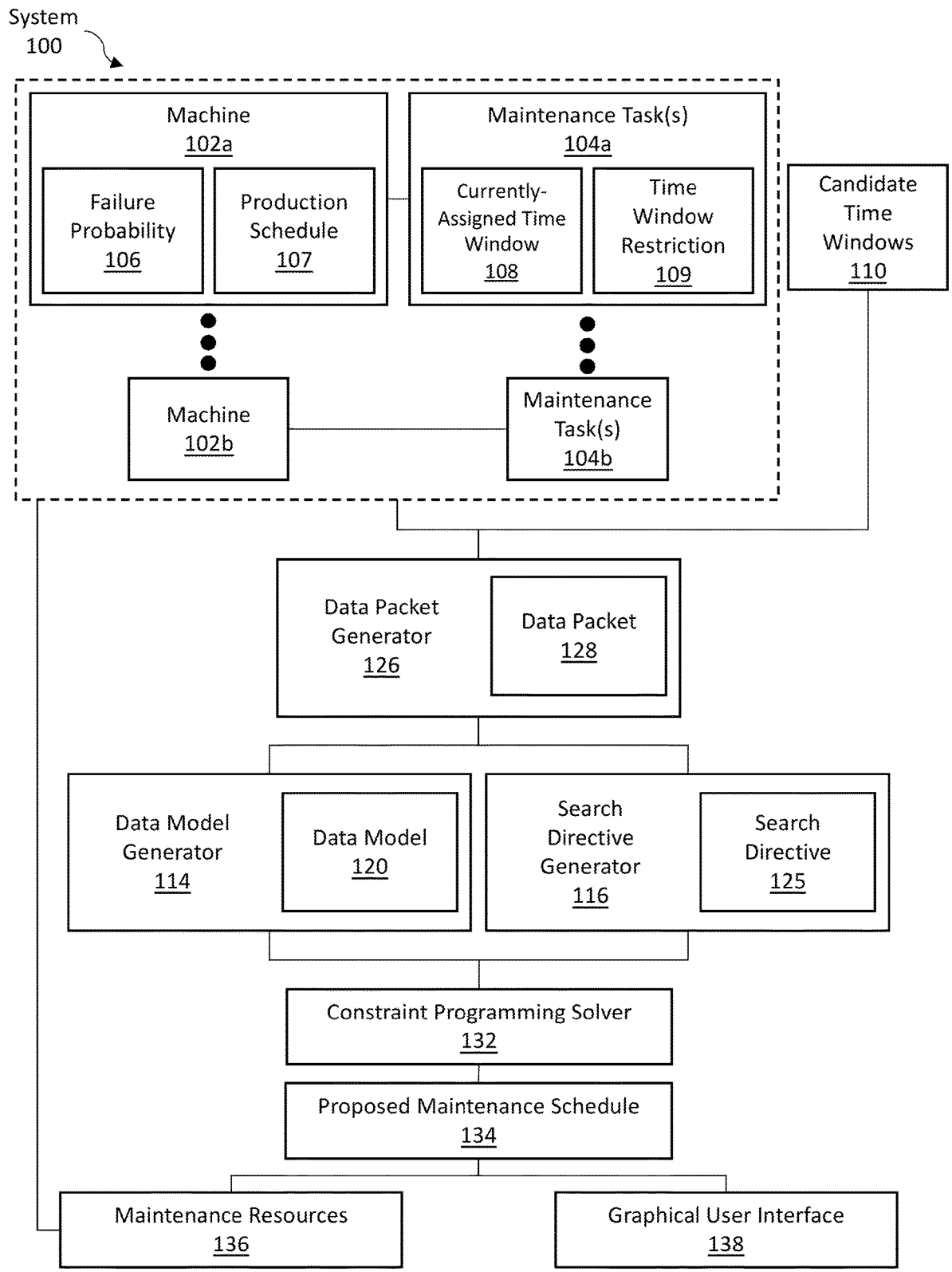
FIGS. 1A-B illustrate a constraint programming data model and search directive generation system, in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. CONSTRAINT PROGRAMMING DATA MODEL AND SEARCH DIRECTIVE GENERATION SYSTEM ARCHITECTURE
3. GENERATING A CONSTRAINT PROGRAMMING DATA MODEL AND SEARCH DIRECTIVE FOR DETERMINING A PROPOSED MAINTENANCE SCHEDULE
   A. DETERMINING A SET OF MACHINES, MAINTENANCE TASKS, CANDIDATE TIME WINDOWS, AND RELATED INFORMATION
   B. DETERMINING A CONSTRAINT PROGRAMMING DATA MODEL
   C. DETERMINING A CONSTRAINT PROGRAMMING SEARCH DIRECTIVE
   D. APPLYING A CONSTRAINT PROGRAMMING DATA MODEL AND SEARCH DIRECTIVE TO A CONSTRAINT PROGRAMMING SOLVER
4. GRAPHICAL USER INTERFACE FOR PRESENTING A PROPOSED MAINTENANCE SCHEDULE
5. HARDWARE OVERVIEW
6. MISCELLANEOUS; EXTENSIONS

1. General Overview

One or more embodiments include using constraint programming to determine a proposed maintenance schedule for performing a set of maintenance tasks for a set of machines.

Constraint programming (CP) is a form of declarative programming. CP obtains a solution to a real-world problem based on a specification of a CP data model and optionally a CP search directive. In contrast, imperative programming is based on a specification of a sequence of steps.

A CP data model includes a set of data model elements; domains of possible values that can be assigned to each element; and one or more constraints that define combinations of values that are allowed to be assigned to the elements. Based on the CP data model, a set of values for the set of elements that satisfies all constraints is determined. A set of values for the set of elements that satisfies all constraints may be referred to herein as a "CP solution."

A CP search directive guides the assignment of a set of values to a set of data model elements that satisfies all constraints, as specified by a CP data model. The CP search directive prioritizes the assignment of certain preferred values over other values for one or more elements. Different CP search directives for a same CP data model may result in a different ordering of CP solutions.

One or more embodiments include generating a CP data model, to be applied to a CP solver, for determining a proposed maintenance schedule for performing a set of machine maintenance tasks, while satisfying at least one or more of the following objectives:

(a) limiting time windows during which each maintenance task may be performed;
(b) limiting a number of maintenance tasks that may be performed during each time period;
(c) minimizing a total cost value for performing the set of maintenance tasks, wherein the cost value for performing a particular maintenance task on a particular machine during a particular task window takes into account various factors such as (i) a failure probability of the machine, (ii) a production schedule of the machine, including a quantity of products to be produced and/or a value of the products, (iii) a time window currently scheduled for the particular maintenance task, and (iv) time window restrictions and/or preferences for the particular maintenance task; and
(d) enforcing respective time window restrictions on each maintenance task.

The CP data model includes at least:
(a) a set of task elements representing a set of maintenance tasks;
(b) a set of time elements representing a set of time windows;
(c) a set of cost elements corresponding to the set of task elements; and
(d) a total cost element.

A domain of a task element indicates candidate time windows for performing the maintenance task represented by the task element. A domain of a time element indicates task counts permitted for the time window represented by the time element. A domain of a cost element, corresponding to a particular task element, indicates various cost values for performing the maintenance task represented by the particular task element during the candidate time windows. A domain of a total cost element indicates possible total cost values for performing the set of maintenance tasks.

Further, the CP data model includes at least:
(a) a global cardinality constraint that requires each task element to be assigned a time window from the respective domain, such that each time element is assigned a task count from the respective domain, wherein a task count for a particular time element is a number of task elements assigned with a time window represented by the particular time element;
(b) a set of one or more element constraints, wherein an element constraint requires each cost element be assigned a cost value associated with performing a corresponding maintenance task during a time window assigned (or to be assigned) to the corresponding maintenance task; and
(c) a sum constraint that requires the total cost element be assigned a total cost value equal to a sum of the cost values assigned (or to be assigned) to the cost elements.

CP is a more efficient way (than imperative programming) for obtaining a proposed maintenance schedule for performing a set of maintenance tasks for a set of machines, while satisfying one or more of the above objectives. CP is more efficient because, as further described below, a CP data model that includes certain constraints is sufficient for obtaining a proposed maintenance schedule that satisfies multiple objectives. Even if there are changes to parameters of the problem (such as the maintenance tasks, time windows, and/or cost values), the constraints of the CP data model do not necessarily need to be changed. In contrast, using imperative programming to solve the problem with multiple objectives would involve a large number of steps.

One or more embodiments include iteratively applying a CP data model to a CP solver to obtain a proposed maintenance schedule. A total cost value associated with a prior solution obtained by the CP solver is used as an upper bound for the domain of the total cost element in a next iteration of the CP solver. The iterative process may be interrupted to request a solution associated with a lowest total cost value thus far. The iterative process may thereafter resume to continue finding solutions with even lower total cost values. The iterative process is complete when the domain of the total cost element is so modified (with the lowering of the upper bound for the domain of the total cost element) that no valid solution satisfying all constraints exists. Then the last-determined solution is the "best" solution associated with the lowest total cost value. A proposed maintenance schedule is determined based on the last-determined solution.

By modifying the CP data model based on a lowest total cost value thus far in each iteration, a set of solutions with total cost values higher than the lowest total cost value thus far are omitted and never attempted. The CP solver may thus more efficiently arrive at a solution with a lowest total cost value possible. Moreover, by modifying the CP data model based on a lowest total cost value thus far in each iteration, a user may interrupt the iterative process at any time to request the solution with the lowest total cost value thus far. The user may determine to use the best solution obtained thus far, without waiting for the CP solver to complete the iterative process.

One or more embodiments include determining a cost value per maintenance task per time window based on machine attributes and/or task attributes. Examples of machine attributes include (a) a failure probability of the machine, and (b) a production schedule of the machine, including a quantity of products to be produced and/or a value of the products. Examples of task attributes include (a) a time window currently scheduled for the maintenance task, and (b) time window restrictions and/or preferences for the maintenance task. The machine attributes and/or task attributes are input into an algorithm that outputs a cost value per maintenance task per time window. The algorithm may rely on multi-attribute utility theory.

The choice of using a single cost value that takes into account the multiple machine attributes and/or task attributes allows a user to customize preferences for assigning the time windows to the maintenance tasks outside of the CP data model. As an example, if the user desires to prioritize repairing machines with high probability of failure rates over minimizing negative impacts caused by repairing to production schedules, then the user may increase the effect on the cost value due to the probability of failure and/or decrease the effect on the cost value due to the interruption of the production schedule.

One or more embodiments include presenting and executing a proposed maintenance schedule. A graphical user interface (GUI) presents the proposed maintenance schedule to one or more users. A GUI may overlay the proposed maintenance schedule on top of the current maintenance schedule. Additionally or alternatively, maintenance resources obtain the proposed maintenance schedule. The maintenance resources perform the maintenance tasks according to the proposed maintenance schedule. The maintenance tasks may be performed with or without human intervention.

The above approach improves a CP solver's ability to determine a proposed maintenance schedule for performing a set of maintenance tasks for a set of machines, while satisfying one or more objectives. Based on a CP data model, as described above, the CP solver may efficiently determine a proposed maintenance schedule associated with a lowest total cost value. Using different CP data models, the CP solver might be able to determine proposed maintenance schedules, but not one that is associated with a lowest total cost value. Additionally or alternatively, the CP solver might not be able to efficiently take into account the various machine attributes and/or task attributes when determining a solution.

The above approach further improves maintenance of a set of machines, and thereby improves the capability of the machines. Without generating a proposed maintenance schedule, as described, machines may be serviced based on default maintenance schedules, without regard to factors that may alter a machine's maintenance needs. Additionally or alternatively, machines may be served without regard to a machine's production schedule. The above-described proposed maintenance schedule decreases failure risk while minimizing disruption to production schedules.

The above approach further improves a GUI for presenting maintenance schedules. Rather than presenting only the current maintenance schedule, or only the proposed maintenance schedule, the GUI concurrently presents both the current maintenance schedule and the proposed maintenance schedule. The GUI overlays the proposed maintenance schedule on the current maintenance schedule. The GUI presents arrows indicating modifications from the current maintenance schedule to the proposed maintenance schedule. Therefore, a user may easily view the schedule modifications, and implement changes to maintenance resources as necessary.

One or more embodiments described in this Specification and/or recited in the claims may not be included in this General Overview section.

2. Constraint Programming Data Model and Search Directive Generation System Architecture FIG. 1 illustrates a constraint programming data model and search directive generation system, in accordance with one or more embodiments. As illustrated in FIG. 1, a system 100 includes a set of machines 102a-b, a set of maintenance tasks 104a-b, candidate time windows 110, a data packet generator 126, a data model generator 114, a search directive generator 116, a constraint programming (CP) solver 132, a proposed maintenance schedule 134, maintenance resources 136, and a graphical user interface (GUI) 138. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In one or more embodiments, a machine (such as any of machines 102a-b) is a hardware apparatus configured to perform one or more functions. Examples of machines include factory machines (such as manufacturing machines), trucks, and computing devices.

Each machine is associated with one or more machine attributes. Examples of machine attributes include a failure probability 106 and a production schedule 107.

A failure probability 106 is a probability that a machine would fail. A machine that has failed operates below a threshold standard, or is completely inoperable. A machine with a greater failure probability may operate less efficiently than a machine with a lesser failure probability. A failure probability may be determined based on various factors. As an example, a failure probability may be determined based on data detected by one or more sensors associated with the machine. The sensors may be installed inside and/or adjacent to the machines. The sensors may detect, for example, a temperature and an air pressure within the machine. The temperature and air pressure may be input to an algorithm to determine the failure probability. The algorithm may be obtained using machine learning. As another example, a failure probability may be determined based on factors such as, a frequency, duration, and/or type of usage of the machine. The factors may be input to an algorithm to determine the failure probability. The algorithm may be obtained using machine learning A production schedule 107 indicates a number and type of products that a machine would produce and/or generate during different time periods. Based on a production schedule 107, a value of the products that would be produced during a particular time period may be determined. If the machine needs to be shut down in order to be serviced, then the lost value for shutting down the machine would include at least the value of the products. The lost value may be used to determine a cost value for servicing the machine during the particular time period (or during a time window including the particular time period).

In one or more embodiments, each machine is associated with one or more maintenance tasks. A maintenance task (such as any of maintenance tasks 104a-b) is a task for maintaining a machine. Different machines may be associated with different maintenance tasks. As an example, maintenance tasks for a factory machine may include performing a routine checkup, replacing gears, and changing oil. Maintenance tasks for a truck may include performing a routine checkup, rotating tires, and changing oil. As illustrated, one or more maintenance tasks 104*a* are to be performed on machine 102*a*; one or more maintenance tasks 104*b* are to be performed on machine 102*b*.

Each maintenance task is associated with one or more task attributes. Examples of task attributes include currently-assigned time window 108, and one or more time window restrictions 109.

A currently-assigned time window 108 is a time window scheduled for performing a maintenance task according to a current maintenance schedule. A current maintenance schedule may be stored in a data repository.

A current maintenance schedule may be determined based on a default maintenance schedule. A default maintenance schedule is a maintenance schedule that is recommended by a machine manual and/or a machine manufacturer. Additionally or alternatively, a current maintenance schedule may be determined based on a prior execution of the operations described herein with reference to FIGS. 2-6. The current maintenance schedule may be determined based on parameters such as failure probabilities, production schedules, previously-assigned time windows, time window restrictions, that were used during the prior execution of the operations as illustrated in FIGS. 2-6. The set of parameters may have been updated or changed since the prior execution of the operations as illustrated in FIGS. 2-6.

A time window restriction 109 is a restriction on a time window to be assigned to a maintenance task. Different types of time window restrictions may be used. As an example, a time window restriction may require that a particular maintenance task not be performed during a particular subset of the candidate time windows. As another example, a time window restriction may require that a particular maintenance task must be performed during a particular subset of the candidate time windows.

As another example, a time window restriction may require a particular sequence of maintenance tasks. Hence, a time window assigned to a particular maintenance task must be before a time window assigned to another maintenance task. As another example, a time window restriction may require a particular set of maintenance tasks to be performed in the same time window. As another example, a time window restriction may require a particular set of maintenance tasks to be performed in different time windows.

Another example of a task attribute is an impact of the maintenance task on an operation of a machine. Performance of a particular task may require that the machine be completely shut down. Performance of another task may reduce a machine's productivity to 75% of the normal level. Performance of yet another task may have no impact to the machine's operation.

In one or more embodiments, candidate time windows 110 are possible time windows for performing a set of maintenance tasks 104*a-b*. The duration of each candidate time window 110 may be any value, such as one day, or two hours. The duration of each candidate time window 110 may be same or different.

In one or more embodiments, a data repository (not illustrated) is any type of storage unit and/or device (e.g., a file system, database, collection of tables, or any other storage mechanism) for storing data. Further, a data repository may include multiple different storage units and/or devices. The multiple different storage units and/or devices may or may not be of the same type or located at the same physical site. A data packet generator 126, data model generator 114, and/or search directive generator 116 may share a single data repository, or may use separate data repositories. Further, a data repository may be implemented or may execute on the same computing system as a data packet generator 126, data model generator 114, and/or search directive generator 116. Alternatively or additionally, a data repository 118 may be implemented or executed on a computing system separate from a data packet generator 126, data model generator 114, and/or search directive generator 116. The data repository 118 may be communicatively coupled to the data packet generator 126, data model generator 114, and/or search directive generator 116 via a direct connection or via a network. A data packet 128, data model 120, and/or search directive 125 may be stored on one or more data repositories.

In one or more embodiments, a data packet 128 includes a set of information about a set of maintenance tasks 104*a-b* and candidate time windows 110. A data packet 128 may be used in generating a data model 120 and/or a search directive 125. In particular, a data packet 128 includes cost values for performing each maintenance task 104*a-b* for each candidate time window 110. A cost value for performing a particular maintenance task may be different for different time windows. As an example, candidate time windows for performing a set of tasks may include $W_1$, $W_2$, $W_3$, $W_4$. Possible time windows for performing a first task $T_1$ may be $W_1$, $W_2$, and $W_4$. Possible time windows for performing a second task $T_2$ may be $W_1$ and $W_3$. A data packet associated with the tasks may include a set of cost values. A first subset of the cost values correspond to $T_1$: $C_{11}$ is a cost value for performing $T_1$ during $W_1$; $C_{12}$ is a cost value for performing $T_1$ during $W_2$; and $C_{14}$ is a cost value for performing $T_1$ during $W_4$. A second subset of the cost values correspond to $T_2$: $C_{21}$ is a cost value for performing $T_2$ during $W_1$; and $C_{23}$ is a cost value for performing $T_2$ during $W_3$. The data packet does not necessarily include any cost value for performing $T_1$ during $W_3$, since $W_3$ is not a possible time window for $T_1$. The data packet does not necessarily include any cost value for performing $T_2$ during $W_2$ or $W_4$, since $W_2$ and $W_4$ are not possible time windows for $T_2$.

In one or more embodiments, a data model 120 (also referred to as a "CP data model") refers to a particular organization, structure, and/or representation of information about a set of maintenance tasks 104*a-b* and candidate time windows 110. A CP data model 120 may be implemented as a software data structure readable by one or more devices including respective hardware processors. A CP data model 120 may include a set of instructions executable by one or more devices including respective hardware processors. A CP data model 120 may serve as an input parameter into a hardware and/or software component, such as a CP solver 132.

Figure 1B:
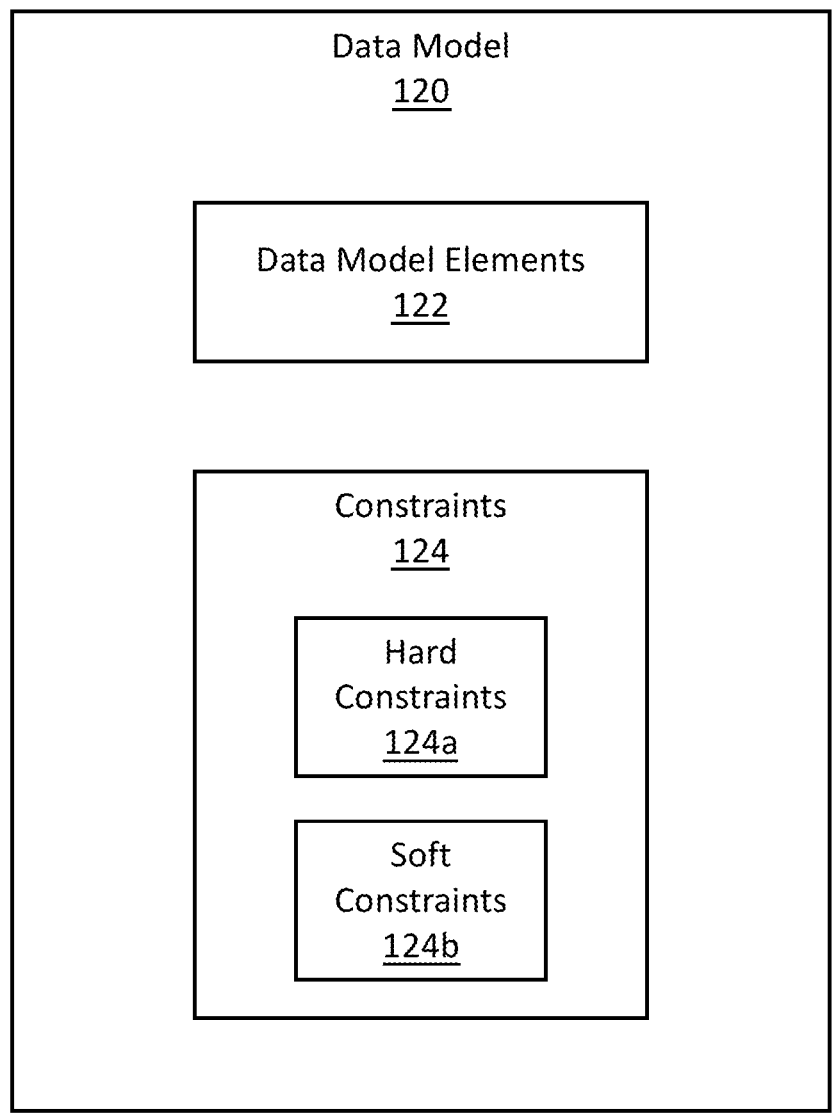

Referring to FIG. 1B, a data model 120 includes a set of data model elements 122. Each data model element is associated with a domain of possible values that can be assigned to the data model element. A data model element cannot be assigned a value that is not within the domain of the data model element. A data model element may be implemented as an array, a vector, a linked list, a table, a software variable, a constant, and/or other software data structures or data objects.

In an embodiment, data model elements 122 in a data model 120 include at least:
  (a) a set of task elements representing a set of maintenance tasks;
  (b) a set of time elements representing a set of time windows;

(c) a set of cost elements corresponding to the set of task elements; and (d) a total cost element.

A domain of a task element indicates candidate time windows for performing the maintenance task represented by the task element. A domain of a time element indicates task counts permitted for the time window represented by the time element. A domain of a cost element, corresponding to a particular task element, indicates various cost values for performing the maintenance task represented by the particular task element during the candidate time windows. A domain of a total cost element indicates possible total cost values for performing the set of maintenance tasks.

As an example, a set of maintenance tasks may include a maintenance task for Canning Machine and a maintenance task for Sealing Machine. A set of candidate time windows may include a 7-day time period (Sunday to Saturday). Server C may be configured to perform the maintenance task for Canning Machine but not the maintenance task for Sealing Machine. Server S may be configured to perform the maintenance task for Sealing Machine but not the maintenance task for Canning Machine. Server C may be loaned to a different user on Friday and therefore unavailable for performing any maintenance tasks on Friday. Meanwhile, Server S may be available all 7 days.

A set of task elements may be expressed as a vector M[i]. M[0] may represent the maintenance task for Canning Machine. M[1] may represent the maintenance task for Sealing Machine. A domain of M[0] may indicate possible time windows for servicing Canning Machine, that is, Sunday, Monday, Tuesday, Wednesday, Thursday, and Saturday. A domain of M[1] may indicate possible time windows for servicing Sealing Machine, that is, Sunday, Monday, Tuesday, Wednesday, Thursday, Friday, and Saturday. Hence, the respective domains of the task elements may be expressed as follows:

M[0]: {0, 1, 2, 3, 4, 6};
M[1]: {0, 1, 2, 3, 4, 5, 6};

wherein the values 0-6 within the domains represent the time windows, Sunday, Monday, Tuesday, Wednesday, Thursday, Friday, and Saturday, respectively.

As another example, a set of time windows may include 8 am-10 am, 10 am-12 pm, and 2 pm-4 pm. Due to limited resources, during 8 am-10 am, a maximum of 4 maintenance tasks may be performed. During 10 am-12 pm, a maximum of 6 maintenance tasks may be performed. During 2 pm-4 pm, a maximum of 5 maintenance tasks may be performed.

A set of time elements may be expressed as a vector T[i]. T[0] may represent the time window 8 am-10 am. T[1] may represent the time window 10 am-12 pm. T[2] may represent the time window 2 pm-4 pm. Hence, the respective domains of the time elements may be expressed as follows:

T[0]: {0, 1, 2, 3, 4};
T[1]: {0, 1, 2, 3, 4, 5, 6};
T[2]: {0, 1, 2, 3, 4, 5};

wherein the values 0-6, within the domains, represent task counts during a time window.

As another example, cost values for performing a first maintenance task may be 100 for a first time window, 200 for a second time window, and 300 for a third time window. Cost values for performing a second maintenance task may be 150 for a first time window, 180 for a second time window, and 150 for a third time window.

A set of cost elements may be expressed as a vector C[i]. C[0] may correspond to the first maintenance task. C[1] may correspond to the second maintenance task. Hence, the respective domains of the cost elements may be expressed as follows:

C[0]: {100, 200, 300};
C[1]: {150, 180};

wherein the values 100, 150, 180, 200, 300, within the domains, represent possible cost values for performing the maintenance tasks.

A total cost element may be expressed as a variable TC. Possible total cost values are determined based on possible assignments of time windows to maintenance tasks. For example, if the first maintenance task is assigned to the first time window and the second maintenance task is assigned to the first time window, then the total cost value is a sum of 100 (for the first maintenance task) and 150 (for the second maintenance task), which is 250. If the first maintenance task is assigned to the second time window and the second maintenance task is assigned to the first time window, then the total cost value is a sum of 200 (for the first maintenance task) and 150 (for the second maintenance task), which is 350. Hence, the domain of the total cost element may be expressed as follows:

TC: {250, 280, 350, 380, 450, 480};

wherein the values 250, 280, 350, 380, 450, 480, within the domain, represent possible total cost values for performing the maintenance tasks.

In an embodiment, a data model 120 accounts for a scenario where the number of maintenance tasks to be performed is greater than a number of time slots provided by the candidate time windows 110. A set of time elements in the data model 120 includes (a) a set of actual time elements, corresponding to the candidate time windows 110, and (b) an overflow time element representing an overflow time window. A domain of the overflow time element includes the range of numbers from 0 to the number of maintenance tasks to be performed. Each task element in the data model 120 has a domain that includes the overflow time window. Each cost element in the data model 120 has a domain that includes an overflow cost value associated with the overflow time window. The overflow cost value is greater than each cost value for actually performing a maintenance task during a candidate time window. Based on the data model 120, a task element that is assigned the overflow time window indicates that the maintenance task represented by the task element is not scheduled for actual performance. Moreover, since the overflow cost value is greater than actual cost values, when an objective of the CP solver is to minimize a total cost value, assignment of the overflow time window occurs only when assignment of any candidate time windows is not possible.

Referring still to FIG. 1B, a data model 120 includes a set of constraints 124, including a hard constraints 124a and a soft constraint 124b. A hard constraint 124a defines combinations of values that are allowed to be assigned to a set of data model elements 122 (such as task elements and time elements described above). A soft constraint 124b specifies a preference for certain one or more values to be assigned to one or more data model elements 122.

In an embodiment, hard constraints 124a in a data model 120 include at least:

(a) a global cardinality constraint (GCC) that requires each task element to be assigned a time window from the respective domain, such that each time element is assigned a task count from the respective domain, wherein a task count for a particular time element is a number of task elements assigned with a time window represented by the particular time element;

(b) an element constraint that requires each cost element be assigned a cost value associated with performing a corresponding maintenance task during a time window assigned (or to be assigned) to the corresponding maintenance task; and (c) a sum constraint that requires the total cost element be assigned a total cost value equal to a sum of the cost values assigned (or to be assigned) to the cost elements.

In an embodiment, a GCC accepts three parameters: (a) a set of data model elements, (b) a set of values that may be assigned to the data model elements, and (c) a set of counting elements for counting a number of times that each value has been assigned.

A set of data model elements input to a GCC needs to be assigned a value from a respective domain.

As an example, a set of data model elements input to a GCC may be the task elements:

M[0]: {0, 1, 2, 3, 4, 6};
M[1]: {0, 1, 2, 3, 4, 5, 6}.

Hence, M[0] needs to be assigned value from {0, 1, 2, 3, 4, 6}. M[1] needs to be assigned value from {0, 1, 2, 3, 4, 5, 6}.

A set of values input to a GCC include any value that may be assigned to any of the set of data model elements input to the GCC.

Referring to the example above, a set of data model elements input to a GCC may be the task elements:

M[0]: {0, 1, 2, 3, 4, 6};
M[1]: {0, 1, 2, 3, 4, 5, 6}.

A set of values input to the GCC may include: {0, 1, 2, 3, 4, 5, 6}.

Hence, the set of values includes any value that may be assigned to any of the data model elements, {0, 1, 2, 3, 4, 5, 6}.

A set of counting elements input to a GCC is a set of counters corresponding to a set of values input to the GCC. Each counter counts a number of times that the corresponding value is assigned to any of a set of data model elements.

Referring to the example above, a set of data model elements input to a GCC may be the task elements:

M[0]: {0, 1, 2, 3, 4, 6};
M[1]: {0, 1, 2, 3, 4, 5, 6}.

A set of values input to the GCC may include {0, 1, 2, 3, 4, 5, 6}.

A set of counting elements input to the GCC may be:

T[0]: {0, 1, 2};
T[1]: {0, 1};
T[2]: {0, 1, 2, 3};
T[3]: {0, 1, 2, 3, 4, 5};
T[4]: {0, 1, 2, 3, 4};
T[5]: {0, 1, 2};
T[6]: {0}.

Hence, T[0] represents a number of times that the value 0 may be assigned. T[1] represents a number of times that the value 1 may be assigned. T[2] represents a number of times that the value 2 may be assigned. T[3] represents a number of times that the value 3 may be assigned. T[4] represents a number of times that the value 4 may be assigned. T[5] represents a number of times that the value 5 may be assigned. T[6] represents a number of times that the value 6 may be assigned.

Further, a domain of T[0] indicates that the value 0 may be assigned (to any data model element) a maximum of 2 times. A domain of T[1] indicates that the value 1 may be assigned (to any data model element) a maximum of 1 time. A domain of T[2] indicates that the value 2 may be assigned (to any data model element) a maximum of 3 times. A domain of T[3] indicates that the value 3 may be assigned (to any data model element) a maximum of 5 times. A domain of T[4] indicates that the value 4 may be assigned (to any data model element) a maximum of 4 times. A domain of T[5] indicates that the value 5 may be assigned (to any data model element) a maximum of 2 times. A domain of T[6] indicates that the value 6 may be assigned a maximum of 0 times (which means, the value 6 cannot be assigned to any data model element at all).

Based on a GCC, a CP solver 132 determines a CP solution wherein each data model element is assigned a value from the respective domain, such that each counting element is assigned a value from the respective domain. Hence, each data model element is assigned a value from the respective domain, while the number of times that each value is assigned is restricted by the domains of the counting elements.

In an embodiment, an element constraint accepts two parameters: (a) an input data model element, and (b) a particular sequence of values. The element constraint outputs to an output data model element.

An output data model element needs to be assigned a value from the domain of the output data model element.

As an example, an output data model element may be the cost element, C[0]: {100, 200, 300}.

Hence, C[0] needs to be assigned value from {100, 200, 300}.

An input data model element input to an element constraint serves to index into a particular sequence of values input to the element constraint. The element constraint returns a particular value from the particular sequence of values that maps to a value assigned (or to-be-assigned) to the input data model.

As an example, an output data model element may be the cost element as described above, C[0]: {100, 200, 300}.

An input data model element may be the task element, M[0]: {0, 1, 2}. A particular sequence of values may be 1300, 100, 2001. The particular sequence of values may indicate cost values for performing a maintenance task represented by M[0] for each candidate time window.

Based on the element constraint, a value of 0 assigned to M[0] maps to 300 of the particular sequence of values; and hence a value of 300 is returned. A value of 1 assigned to M[0] maps to 100 of the particular sequence of values; and hence a value of 100 is returned. A value of 2 assigned to M[0] maps to 200 of the particular sequence of values; and hence a value of 200 is returned. A CP solver 132 determines a CP solution wherein a value returned from the element constraint is within the domain of the cost element.

In an embodiment, a sum constraint accepts as a parameter a set of input data model elements. The sum constraint outputs to an output data model element.

An output data model element needs to be assigned a value from the domain of the output data model element.

As an example, an output data model element may be the total cost element, TC: {150, 250, 280, 350, 380, 450, 480}.

Hence, TC needs to be assigned value from {150, 250, 280, 350, 380, 450, 480}.

The sum constraint returns a sum of values assigned (and/or to-be-assigned) to a set of input data model elements.

Referring to the example above, an output data model element may be the total cost element, TC: {150, 250, 280, 350, 380, 450, 480}.

A set of input data model elements may be a set of cost elements, each corresponding to a respective task element. The cost elements may be:

C[0]: {100, 200, 300, 400}
C[1]: {50, 150, 180}

Based on the sum element, a sum of the values assigned (and/or to-be-assigned) to the set of cost elements is returned. A CP solver 132 determines a CP solution wherein a sum returned from the sum constraint is within the domain of the total cost element.

In this example, certain assignments would result in a sum returned from the sum constraint being outside of the domain of the total cost element. For example, if 400 is assigned to C[0] and 150 is assigned to C[1], then the sum would be 550. However, 550 is outside of the domain of the total cost element. Hence, the sum constraint is not satisfied. Any CP solution returned by the CP solver 132 would not include such an assignment.

In an embodiment, hard constraints 124a may also include a constraint based on a time window restriction. As an example, a constraint may specify that time windows assigned to certain task elements be the same. Another constraint may specify that time windows assigned to certain other task elements be different. Another constraint may specify that a time window assigned to a particular task element must be before a time window assigned to another particular task element.

Referring back to FIG. 1A, in one or more embodiments, a search directive 125 is a directive that guides a CP solver 132 in the process of determining a CP solution given a particular data model 120. A search directive 125 guides the assignment of a set of values to a set of data model elements that satisfies all constraints, as specified by a data model 120. A search directive 125 prioritizes the assignment of certain values over other values for one or more data model elements. Different search directives 124 for a same data model 120 may result in a different ordering of CP solutions, and/or a different approach for arriving at a same CP solution(s). A search directive 125 may be implemented as a software data structure. A search directive 125 may include a set of computer-readable instructions. A search directive 125 may serve as an input parameter into a hardware and/or software component, such as a CP solver 132.

In one or more embodiments, a data packet generator 126 refers to hardware and/or software configured to generate a data packet 128 for generating a data model 120 and/or a search directive 125. Examples of operations for generating a data packet 128 are described below with reference to FIG. 2.

In one or more embodiments, a data model generator 114 refers to hardware and/or software configured to generate a data model 120. Examples of operations for generating a data model 120 are described below with reference to FIGS. 3A-B.

In one or more embodiments, a search directive generator 116 refers to hardware and/or software configured to generate a search directive 125. Examples of operations for generating a search directive 125 are described below with reference to FIG. 4.

In one or more embodiments, a CP solver 132 refers to hardware and/or software configured to determine a CP solution, given a data model 120 and optionally a search directive 125, using constraint programming techniques. Constraint programming techniques include, for example, backtracking algorithms and forward-checking algorithms.

In one or more embodiments, a data packet generator 126, data model generator 114, search directive generator 116, and/or CP solver 132 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a mainframe, a television, a content receiver, a set-top box, a printer, a mobile handset, a smartphone, and/or a personal digital assistant (PDA).

In one or more embodiments, a proposed maintenance schedule 134 is a schedule for performing one or more maintenance tasks 104a-b based on a CP solution determined by a CP solver 132. The CP solution is determined based on a data model 120 and optionally a search directive 125. A proposed maintenance schedule 134 may be a revision from a current maintenance schedules for the set of maintenance tasks 104a-b.

In one or more embodiments, maintenance resources 136 refers to hardware and/or software configured to perform one or more operations of maintenance tasks 104a-b for a set of machines 102a-b. Additionally or alternatively, maintenance resources 136 refers to human resources skilled to perform one or more operations of maintenance tasks 104a-b for a set of machines 102a-b. Different maintenance resources 136 may be required for different maintenance tasks 104a-b. As an example, a maintenance task may be an oil change. Maintenance resources for the maintenance task may include an oil changing machine, new oil, and a worker skilled to operate the oil changing machine. As another example, a maintenance task may be a software update. Maintenance resources for the maintenance task may include a server configured to perform the software update. As another example, a maintenance task may be garbage collection for an application. Maintenance resources for the maintenance task may include a garbage collector configured to perform garbage collection on a memory associated with the application.

In some embodiments, maintenance resources 136 includes only machines, computing devices, and/or tools, without any human intervention. Performance of a maintenance task is hence fully automated. In some embodiments, maintenance resources 136 may include workers with particular skills, such as workers capable of operating an oil changing machine, or workers capable of operating a computer server.

In one or more embodiments, a GUI 138 refers to hardware and/or software configured to facilitate communications between (a) a user and (b) a CP solver 132. A GUI 138 may be rendered and/or displayed on a screen and/or monitor. A GUI 138 may present one or more interface elements for presenting information to a user and/or for receiving information from a user. Examples of interface elements include checkboxes, radio buttons, dropdown lists, list boxes, buttons, toggles, text fields, date and time selectors, command lines, sliders, pages, and/or forms. Other types of user interfaces include a command line interface (CLI), a haptic interface, and a voice command interface.

Components of a GUI 138 may be specified in one or more languages, such as Java, C, and/or C++. In some embodiments, the behavior of interface elements is specified in a dynamic programming language, such as JavaScript. The content of interface elements is specified in a markup language, such as hypertext markup language (HTML) or XML User Interface Language (XUL). The layout of interface elements is specified in a style sheet language, such as Cascading Style Sheets (CSS).

In an embodiment, a GUI 138 presents a proposed maintenance schedule 134 overlaid on top of one or more current maintenance schedules 110*a-b*. The proposed maintenance schedule 134 and the current maintenance schedules 110*a-b* may be associated with different visualizations, such as colors, shapes, and/or animations. A GUI 138 presents an interface element configured to receive user input accepting, rejecting, and/or further modifying a proposed maintenance schedule 134.

3. Generating a Constraint Programming Data Model and Search Directive for Obtaining a Proposed Maintenance Schedule One or more operations illustrated in FIGS. 2-6 may be modified, rearranged, and/or omitted all together. Accordingly, the particular sequence of operations illustrated in FIGS. 2-6 should not be construed as limiting the scope of one or more embodiments.

A. Determining a Set of Machines, Maintenance Tasks, and Related Information

Figure 2:
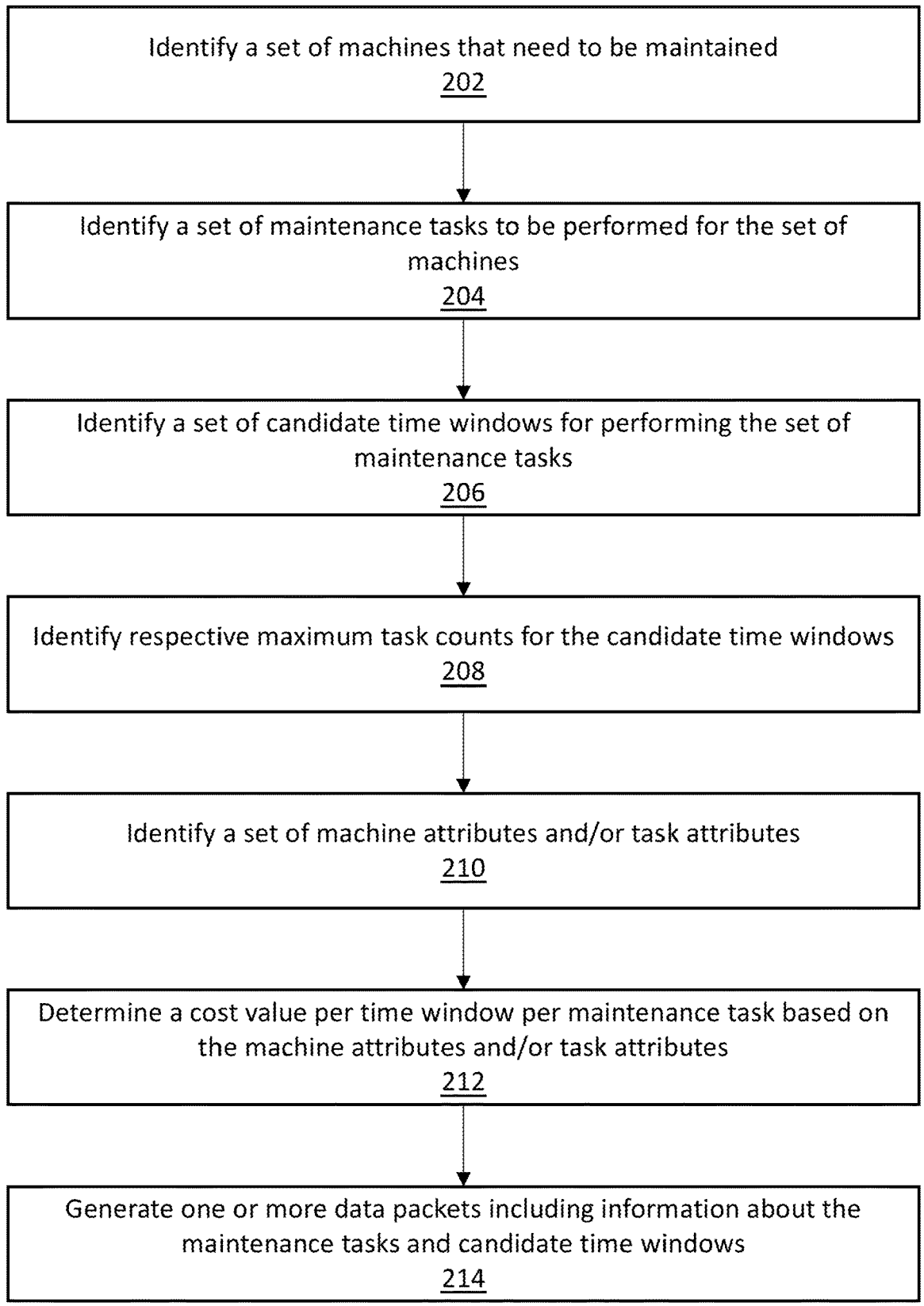
FIG. 2 illustrates an example set of operations for generating a data packet including information about a set of maintenance tasks and a set of candidate time windows, in accordance with one or more embodiments.

FIG. 2 illustrates an example set of operations for generating a data packet including information about a set of maintenance tasks and a set of candidate time windows, in accordance with one or more embodiments.

One or more embodiments include identifying a set of machines that need to be maintained (Operation 202). A data packet generator 126 obtains identities of a set of machines that need to be maintained from a data repository. As an example, a set of machines that need to be maintained may be factory machines in a factory. A data model generator may obtain identities of the factory machines from a machine database. As another example, a set of machines that need to be maintained may be trucks of a delivery company. A data model generator may obtain identities of the trucks from a truck database. As another example, a set of machines that need to be maintained may be cloud servers in a cloud network. A data model generator may obtain identities of the cloud servers from a master server.

One or more embodiments include identifying a set of maintenance tasks to be performed for the set of machines (Operation 204). The data packet generator 126 obtains a set of maintenance tasks to be performed for the set of machines from a data repository. The data packet generator 126 may obtain identities of one or more maintenance tasks (such as, a task identifier (ID) corresponding to each maintenance task). Additionally or alternatively, the data packet generator 126 may obtain instructions, which when executed by at least one device including a hardware processor, performs one or more maintenance tasks.

The data packet generator 126 may obtain one or more maintenance tasks to performed on a particular machine. As an example, a set of machines to be maintained may include Garment Machine and Ironing Machine. A data packet generator may determine that Garment Machine requires two maintenance tasks: replacing gears, and cleaning crevices. The data packet generator may determine that Ironing Machine requires one maintenance task: replacing metal plates.

One or more embodiments include identifying a set of candidate time windows for performing the set of maintenance tasks (Operation 206). The data packet generator 126 obtains a set of candidate time windows for performing the set of maintenance tasks from a data repository. The set of candidate time windows may be specified by a user. Additionally or alternatively, the set of candidate time windows may be determined by an application. The set of candidate time windows for performing the set of maintenance tasks may be determined based on availability of maintenance resources. The duration of each candidate time window may be the same or different.

The data packet generator determines possible time windows for performing each maintenance task. The possible time windows for a maintenance task may be specified by a user. Additionally or alternatively, the possible time windows for a maintenance task may be determined by an application. The possible time windows for a maintenance task may be expressed as a time window restriction. As an example, a time window restriction may indicate that a particular maintenance task may be performed during only a subset of a set of candidate time windows. Hence, the subset of candidate time windows are the possible time windows for the particular maintenance task.

Possible time windows for performing each maintenance task may be the same or different. As an example, a data packet generator may determine that possible time windows for performing a software update maintenance task include: Monday, Tuesday, and Wednesday. The data packet generator may further determine that possible time windows for performing a garbage collection maintenance task include: Thursday, and Friday. As another example, a data packet generator may determine that possible time windows for an oil change task are: 10 am-11 am, and 12 pm-1 pm, on a daily basis. The data model generator may further determine that possible time windows for a tire rotation task are: 12 pm-2 pm, and 3 pm-4 pm, on a daily basis.

One or more embodiments include identifying respective maximum task counts for the candidate time windows (Operation 208). The data packet generator 126 obtains respective maximum task counts for the candidate time windows from a data repository. The maximum task counts for the candidate time windows may be the same or different.

One or more embodiments include identifying a set of machine attributes and/or task attributes (Operation 210). The data packet generator 126 identifies a set of machine attributes and/or task attributes.

In an embodiment, the data packet generator 126 obtains a set of failure probabilities corresponding to the set of machines from a data repository. The set of failure probabilities may be specified by a user. Additionally or alternatively, the set of failure probabilities may be determined by an application. The set of failure probabilities may be determined based on various factors, such as data detected by one or more sensors associated with one or more machines, usage frequencies of the machines, usage durations of the machines, and/or types of usage of the machines.

As an example, a set of machines may include factory machines. A sensor associated with a particular factory machine may detect an internal temperature of the particular factory machine. A failure probability of the particular factory machine may be determined based on the internal temperature. As another example, a set of machine may include a fleet of trucks. A sensor associated with a particular truck may detect a number of miles traveled by the truck. A failure probability of the particular truck may be determined based on the mileage on the truck.

In an embodiment, the data packet generator 126 obtains a set of production schedules corresponding to the set of machines from a data repository. A production schedule may indicate that different quantities of different products are produced and/or generated by a particular machine at different times.

In an embodiment, the data packet generator 126 obtains a current maintenance schedule for the set of maintenance tasks from a data repository. The current maintenance schedule may be specified by a user. Additionally or alternatively, the current maintenance schedule may be determined by an application. The current maintenance schedule may be determined based on various factors, such as a recommended service interval, and a maintenance schedule previously determined by a CP solver. The current maintenance schedule indicates a currently-assigned time window for each maintenance task.

In an embodiment, the data packet generator 126 obtains one or more time window restrictions for the set of maintenance tasks from a data repository. Different time window restrictions may be associated with different maintenance tasks.

In an embodiment, the data packet generator 126 obtains respective impacts of the maintenance tasks on an operation of a corresponding machine from a data repository. Different maintenance tasks may be associated with different impacts. The impact of a particular maintenance task on an operation of a machine may be specified by a user. Additionally or alternatively, the impact of a particular maintenance task on an operation of a machine may be determined by an application. As an example, an application may monitor historical data indicating impacts from previous executions of a maintenance task. The application may determine and/or predict an impact of the maintenance task based on the prior impacts.

One or more embodiments include determining a cost value per time window per maintenance task based on the machine attributes and/or task attributes (Operation 212). The data packet generator 126 identifies a subset of machine attributes and/or task attributes relevant to each cost value. For a particular cost value associated with performing a particular maintenance task on a particular machine during a particular time window, the relevant attributes include the machine attributes of the particular machine during the particular time window. The relevant attributes also include the task attributes of the particular maintenance task during the particular time window.

The data packet generator 126 determines an effect on each cost value due to each attribute relevant to the cost value. Various methods may be used for determining an effect on a cost value due to an attribute, examples of which are described below.

In an embodiment, the data packet generator 126 determines an effect on a particular cost value for performing a particular maintenance task on a particular machine during a particular time window due to a particular failure probability of the particular machine. In an embodiment, the data packet generator 126 determines a set of failure probabilities of the set of machines being maintained. The data packet generator 126 normalizes and/or ranks the particular failure probability based on the set of failure probabilities. The normalized result and/or ranking is the effect on the particular cost value due to the particular failure probability. In another embodiment, the data packet generator 126 simply takes the failure probability itself as the effect on the particular cost value due to the particular failure probability. Hence, a greater failure probability results in a greater effect on a cost value. Further, an effect on each cost value for performing a particular maintenance task on a particular machine for each different time window due to a failure probability of the particular machine may be the same.

In an embodiment, the data packet generator 126 determines an effect on a particular cost value for performing a particular maintenance task on a particular machine during a particular time window due to a currently-assigned time window for the particular maintenance task. The data packet generator 126 obtains a current maintenance schedule from a data repository. The data packet generator 126 determines a currently-assigned time window for the particular maintenance task according to the current maintenance schedule. The data packet generator 126 determines a difference between the particular time window and the currently-assigned time window. The difference is the effect on the particular cost value due to the currently-assigned time window. Hence, a greater difference results in a greater effect on a cost value. Determining an effect on a cost factor due to a currently-assigned time window is one way of indicating a preference for the currently-assigned window in a CP data model.

In an embodiment, the data packet generator 126 determines an effect on a particular cost value for performing a particular maintenance task on a particular machine during a particular time window due to a time window restriction for the particular maintenance task. The data packet generator 126 determines that a time window restriction indicates a preference for a certain preferred time window to be assigned to the particular maintenance task. The data packet generator 126 determines a difference between the particular time window and the preferred time window. The difference is the effect on the particular cost value due to the time window restriction. Hence, a greater difference results in a greater effect on a cost value. Determining an effect on a cost factor due to a preferred time window is one way of indicating the preference in a CP data model.

In an embodiment, the data packet generator 126 determines an effect on a particular cost value for performing a particular maintenance task on a particular machine during a particular time window due to a particular production schedule of the particular machine and/or an impact of the particular maintenance task. In an embodiment, the data packet generator 126 determines an impact on the particular machine's operation caused by the particular maintenance task. If the impact is zero, then the effect due to the particular maintenance task is also zero. If the impact is that the particular machine needs to be shut down, then the data packet generator 126 determines a particular value of the products to be produced and/or generated during the particular time window according to the particular production schedule. The particular value of the products is the lost value caused by the particular maintenance task on the particular machine. If the impact is that only a particular percentage of the products can be produced, then the data packet generator 126 determines a number of products to be produced and/or generated during the particular time window according to the particular production schedule. The data packet generator 126 applies the particular percentage to the number of products to be generated without the particular maintenance task to determine a number of products to be generated with the particular maintenance task. The data packet generator 126 determines a difference between the number of products to be generated without the particular maintenance task and the number of products to be generated with the particular maintenance task. The data packet generator 126 determines a lost value corresponding to the products that can no longer be produced as a result of performing the particular maintenance task. The lost value is the impact caused by the particular maintenance task on the particular machine.

In an embodiment, the data packet generator 126 determines a lost value due to the particular maintenance task during each of the remaining time windows according to the particular production schedule. The data packet generator 126 normalizes and/or ranks the particular lost value during the particular time window based on the lost values during each of the remaining time windows. The normalized result and/or ranking is the effect on the particular cost value due to the particular production schedule. In another embodiment, the data packet generator 126 determines lost values for the particular machine during each of the remaining time windows according to the particular production schedule. The data packet generator 126 also determines lost values, caused by the particular maintenance task, for each of the remaining machines during each time window according to respective production schedules of the machines. The data packet generator 126 normalizes and/or ranks the particular lost value for the particular machine during the particular time window based on the lost values for each machine during each time window. The normalized result and/or ranking is the effect on the particular cost value due to the particular production schedule. In another embodiment, the data packet generator 126 simply takes the particular lost value for the particular machine during the particular time window caused by the particular maintenance task as the effect on the particular cost value due to the particular production schedule. Hence, a greater lost value for a machine results in a greater effect on a cost value.

The data packet generator 126 determines aggregates effects due to various attributes described above in order to determine a cost value. Various methods may be used for determining a cost value, examples of which are described below.

In an embodiment, the data packet generator 126 determines a sum of the effects as the cost value. In another embodiment, the data packet generator 126 determines a product of the effects as the cost value. In another embodiment, the data packet generator 126 computes a weighted sum of the effects. The data packet generator 126 applies a first weight to the effect due to a failure probability, a second weight to the effect due to a current-assigned time window, and a third weight to the effect due to a lost value. The data packet generator 126 determines a sum of the weighted effects. The sum is the cost value.

In an embodiment, the data packet generator 126 applies a multi-attribute utility function to the machine attributes and/or task attributes. The multi-attribute utility function represents cost values given a production schedule and a failure probability. A machine may generate a value of goods according to the production schedule if the machine does not fail, but may generate zero value if the machine does fail. Based on at least the production schedule and failure probability, the multi-attribute utility function outputs a cost value for each time window for each maintenance task.

Cost values for a particular maintenance task during each time window may be the same or different. Cost values for each maintenance task during a particular time window may be the same or different. As an example, a set of maintenance tasks include: Task A, Task B, and Task C. Time windows available for performing Task A are: Monday and Wednesday. Time windows available for performing Task B are: Monday, Wednesday, and Friday. Time windows available for performing Task C are: Tuesday and Thursday. Based on a set of machine attributes and task attributes, a data packet generator may determine that a set of cost values for Task A, Task B, and Task C during the time windows Monday through Friday are as follows:

TABLE 1

|        | Monday | Tuesday | Wednesday | Thursday | Friday |
|--------|--------|---------|-----------|----------|--------|
| Task A | 98     | N/A     | 30        | N/A      | N/A    |
| Task B | 45     | N/A     | 65        | N/A      | 70     |
| Task C | N/A    | 53      | N/A       | 88       | N/A    |

One or more embodiments include generating one or more data packets including information about the maintenance tasks and candidate time windows (Operation 214). The data packet generator 126 generates one or more data packets based on the information obtained at Operations 202-212. The data packet indicates the maintenance tasks to be performed, and the candidate time windows for performing the maintenance tasks. The data packet indicates respective maximum task counts for the candidate time windows. The data packet indicates cost values per time window per maintenance task. The data packet may be stored as a software data structure. The data packet may include one or more arrays, vectors, linked lists, tables, software variables, constants, and/or data objects. The data packet may include a set of instructions executable by one or more devices including a hardware processor.

B. Determining a Constraint Programming Data Model

Figure 3A:
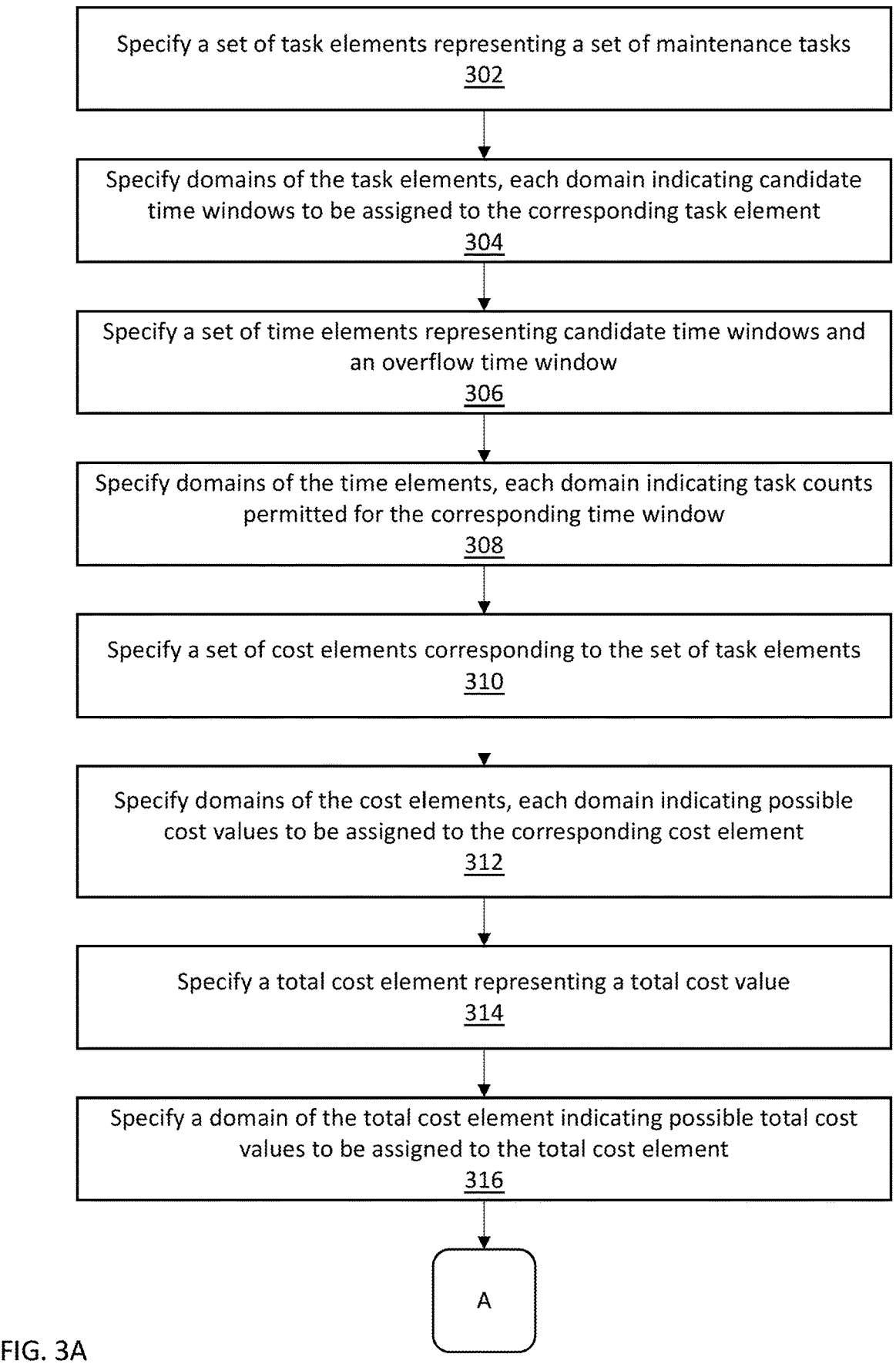
FIGS. 3A-B illustrate an example set of operations for generating a constraint programming data model, in accordance with one or more embodiments.
Figure 3B:
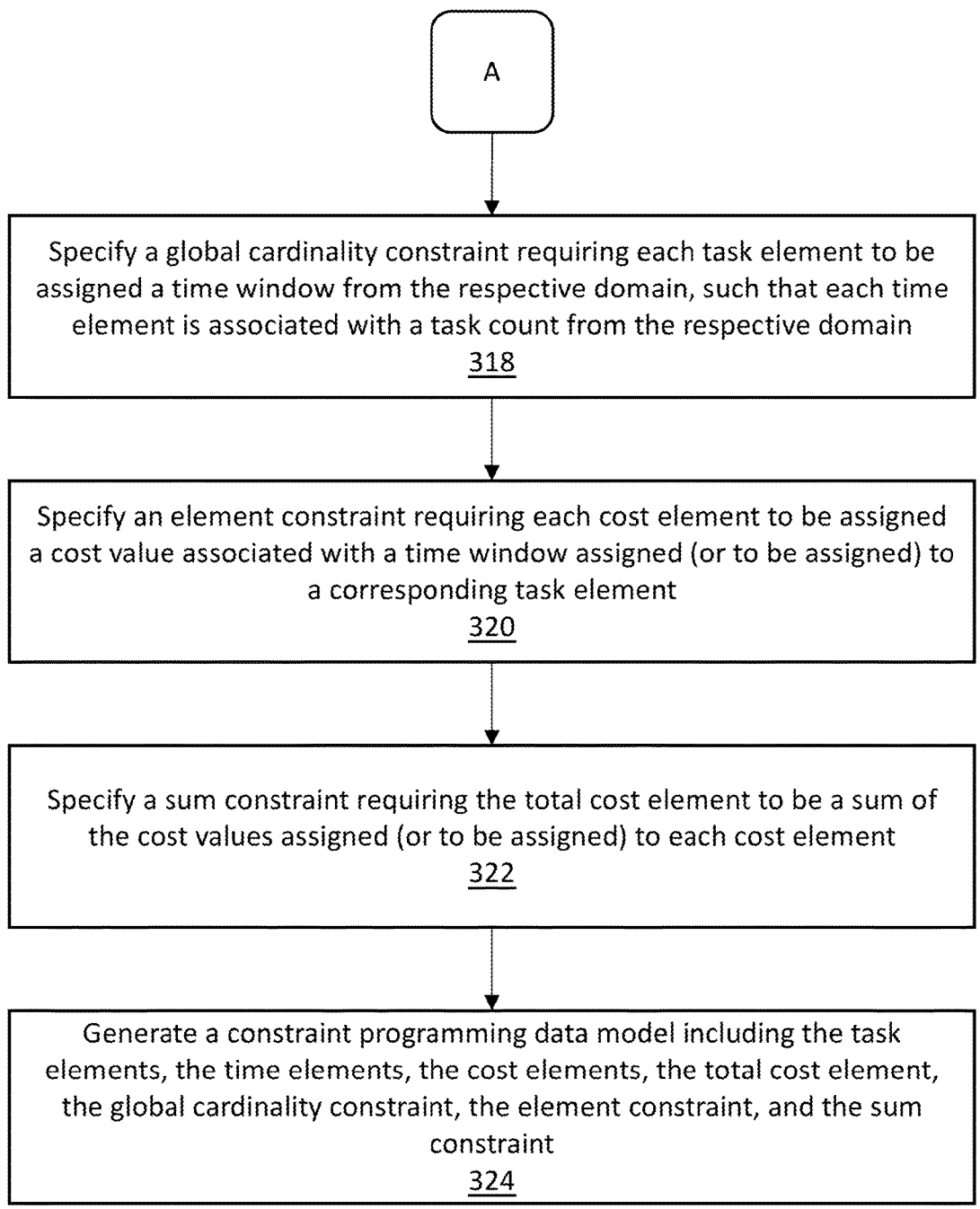

FIGS. 3A-B illustrates an example set of operations for generating a constraint programming data model, in accordance with one or more embodiments.

One or more embodiments include specifying a set of task elements, each task element representing a maintenance task (Operation 302). A data model generator 114 specifies a set of task elements. The set of task elements may be represented by a vector, an array, and/or any other data structure. Each task element represents one of the set of maintenance tasks determined at Operation 204 of FIG. 2.

One or more embodiments include specifying domains of the task elements, each domain representing candidate time windows for performing a maintenance task (Operation 304). The data model generator 114 specifies domains of the task elements. Each domain may be represented by a vector, an array, and/or any other data structure. A domain for a particular task element represents the set of candidate time windows for performing a maintenance task represented by the particular task element. Optionally, each of the domains of the task elements may also include an overflow time window.

As an example, a set of maintenance tasks may include Task A and Task B. Candidate time windows for performing Task A may include Monday and Tuesday. Candidate time windows for performing Task B may include Wednesday and Thursday.

A data model generator may specify a set of task elements, representing the maintenance tasks, expressed as vector M[i]. M[0] may represent Task A. M[1] may represent Task B. The domains of the task elements may be as follows:

M[0]: {1, 2, 7}
M[1]: {3, 4, 7} wherein the values 0-7 within the domains represent (a) candidate time windows, Sunday, Monday, Tuesday, Wednesday, Thursday, Friday, Saturday, and (b) an overflow time window, respectively. The overflow time window (represented by "7") is included each domain of the task elements.

One or more embodiments include specifying a set of time elements, each time element representing a candidate time window (Operation 306). The data model generator 114 specifies a set of time elements. The set of time elements may be represented by a vector, an array, and/or any other data structure. Each time element represents one of the set of time windows determined at Operation 208 of FIG. 2. Optionally, an additional time element represents the overflow time window.

One or more embodiments include specifying domains of the time elements, each domain representing task counts permitted during a time window (Operation 308). The data model generator 114 specifies domains of the time elements. Each domain may be represented by a vector, an array, and/or any other data structure. A domain for a particular time element represents the task counts permitted during a time window represented by the particular time element. A domain for the overflow time window may indicate that a maximum task count for the overflow time window is equal to the number of maintenance tasks.

As an example, a set of time windows may include 9 am-11 am, 12 pm-2 pm, and 3 pm-5 pm. A maximum number of maintenance tasks that may be performed during 9 am-11 am may be 3. Hence, tasks counts permitted during 9 am-11 am are: 0, 1, 2, 3. A maximum number of maintenance tasks that may be performed during 12 pm-2 pm may be 2. Hence, tasks counts permitted during 12 pm-2 pm are: 0, 1, 2. A maximum number of maintenance tasks that may be performed during 3 pm-5 pm may be 4. Hence, tasks counts permitted during 3 pm-5 pm are: 0, 1, 2, 3, 4. A number of maintenance tasks to be performed may be six. Hence, task counts permitted for the overflow time window are: 0, 1, 2, 3, 4, 5, 6.

A data model generator may specify a set of time elements, representing the time windows, expressed as vector T[i]. T[0] may represent 9 am-11 am. T[1] may represent 12 pm-2 pm. T[2] may represent 3 pm-5 pm. T[3] may represent an overflow time window. The domains of the time elements may be as follows:

T[0]: {0, 1, 2, 3}
T[1]: {0, 1, 2}
T[2]: {0, 1, 2, 3, 4}
T[3]: {0, 1, 2, 3, 4, 5, 6}

One or more embodiments include specifying a set of cost elements corresponding to the set of task elements (Operation 310). The data model generator 114 specifies a set of cost elements. The set of cost elements may be represented by a vector, an array, and/or any other data structure. Each cost element corresponds to the set of task elements determined at Operation 302.

One or more embodiments include specifying domains of the set of cost elements, each domain indicating possible cost values to be assigned to the corresponding cost element (Operation 312). The data model generator 114 specifies domains of the cost elements. Each domain may be represented by a vector, an array, and/or any other data structure. A domain for a particular cost element represents possible cost values to be assigned to the corresponding cost element. The possible cost values include at least a subset of the set of cost values determined at Operation 212 of FIG. 2.

Optionally, if an overflow time window is used, the domain of each cost element may further include an overflow cost value for the overflow time window. The overflow cost value is any value greater than the largest possible cost value.

As an example, a set of maintenance tasks may include Task A and Task B. Candidate time windows for performing Task A may include Monday and Tuesday. Candidate time windows for performing Task B may include Wednesday and Thursday.

For Task A, a cost value for Monday may be 100; a cost value for Tuesday may be 200. For Task B, a cost value for Wednesday may be 300; a cost value for Thursday may be 350.

A data model generator may specify a set of task elements, representing the maintenance tasks, expressed as vector M[i], as follows:

M[0]: {1, 2, 7}
M[1]: {3, 4, 7} wherein the values 0-7 within the domains represent (a) candidate time windows, Sunday, Monday, Tuesday, Wednesday, Thursday, Friday, Saturday, and (b) an overflow time window, respectively.

The data model generator may further specify a set of cost elements, expressed as a vector C[i]. The cost elements correspond to the task elements, such that C[i] corresponds to M[i]. Hence, C[0] corresponds to M[0], and C[1] corresponds to M[1].

The data model generator may further specify domains of the cost elements. The domain of each cost element indicates possible cost values for performing the corresponding maintenance task. Hence, the domain of C[0] includes the possible cost values for performing Task A, which are 100 and 200. The domain of C[1] includes the possible cost values for performing Task B, which are 300 and 350.

The domain of each cost element further includes an overflow cost value, which is greater than the largest possible cost value. Since the possible cost values are 100, 200, 300, and 350, the overflow cost value may be any number greater than 350.

Hence, the cost elements may be expressed as follows:

C[0]: {100, 200, 1000}
C[1]: {300, 350, 1000} wherein the value 1000 within the domains represent the overflow cost value. The overflow cost value is included each domain of the cost elements.

One or more embodiments include specifying a total cost element representing a total cost value (Operation 314). The data model generator 114 specifies a total cost element. The total cost element may be represented by a vector, an array, a variable, and/or any other data structure.

One or more embodiments include specifying a domain of the total cost element indicating possible total cost values to be assigned to the total cost element (Operation 316). The data model generator 114 specifies a domain of the total cost element. The domain may be represented by a vector, an array, and/or any other data structure. A domain for the total cost element represents possible total cost values to be assigned to the total cost element. The possible cost values include the possible sums determined from the possible cost values for the set of cost elements.

As an example, a data model generator may specify a set of cost elements:

C[0]: {100, 200, 1000}
C[1]: {300, 350, 1000}

Possible sums determined from the possible cost values include:

100+300=400
100+350=450
100+1000=1100
200+300=500
200+350=550
200+1000=1200
1000+300=1300
1000+350=1350
1000+1000=2000

The data model generator may specify a total cost element, expressed as a vector TC, as follows:

TC: {400, 450, 500, 550, 1100, 1200, 1300, 1350, 2000}

One or more embodiments include specifying a global cardinality constraint requiring each task element to be assigned a time window from the respective domain, such that each time element is associated with a task count from the respective domain (Operation 318). The data model generator 114 specifies a global cardinality constraint (GCC) requiring each task element to be assigned a time window from the respective domain, such that each time element is associated with a task count from the respective domain. The constraint requires that a particular task element be assigned a time window from a domain of the particular task element. The constraint requires that a particular time element is associated with a task count from a domain of the particular time element.

In an embodiment, the data model generator 114 specifies a GCC with the inputs: (a) the set of task elements, (b) values that may be assigned to any of the set of task elements, and (c) the set of time elements. Based on the GCC, each task elements is assigned a value from a domain of the task element. Further, the set of time elements serve as counting elements that count a number of times each time window is assigned. Each time element may only assume a value from a domain of the time element. In other embodiments, other types of constraints may be used for expressing a constraint requiring each task element to be assigned a time window from the respective domain, such that each time element is associated with a task count from the respective domain.

One or more embodiments include specifying an element constraint requiring each cost element to be assigned a cost value associated with a time window assigned (or to be assigned) to a corresponding task element (Operation 320). The data model generator 114 specifies an element constraint requiring each cost element to be assigned a cost value associated with a time window assigned (or to be assigned) to a corresponding task element.

In an embodiment, the data model generator 114 specifies an element constraint with the inputs: (a) a particular task element, and (b) a particular sequence of values indicating a cost value for performing the maintenance task represented by the particular task element during each time window. The data model generator 114 specifies that the element constraints outputs to a particular cost element corresponding to the particular task element. Based on the element constraint, the time window assigned to the particular task element maps to a particular value within the particular sequence of values. The particular value must be within the domain of the particular cost element. In other embodiments, other types of constraints may be used for expressing a constraint requiring each cost element to be assigned a cost value associated with a time window assigned (or to be assigned) to a corresponding task element.

One or more embodiments include specifying a sum constraint requiring the total cost element to be a sum of the cost values assigned (or to be assigned) to each cost element (Operation 322). The data model generator 114 specifies a sum constraint requiring the total cost element to be a sum of the cost values assigned (or to be assigned) to each cost element.

In an embodiment, the data model generator 114 specifies a sum constraint with the inputs being the set of cost elements. The data model generator 114 specifies that the sum constraint outputs to the total cost element. Based on the sum constraint, the sum of the values assigned (or to be assigned) to each cost element must be within the domain of the total cost element. In other embodiments, other types of constraints may be used for expressing a constraint requiring the total cost element to be a sum of the cost values assigned (or to be assigned) to each cost element.

One or more embodiments include generating a data model including the task elements, the time elements, the cost elements, the total cost element, the global cardinality constraint, the element constraint, and the sum constraint (Operation 324). The data model generator 114 generates a data model including the task elements, the time elements, the cost elements, the total cost element, the global cardinality constraint, the element constraint, and the sum constraint. The data model may be stored as a software data structure. The data model may include one or more arrays, vectors, linked lists, tables, software variables, constants, and/or data objects. The data model may include a set of instructions executable by one or more devices including a hardware processor.

C. Determining a Constraint Programming Search Directive

As described above, a preference for assigning a particular maintenance task to a preferred time window may be indicated in a data model by incorporating the preference with cost factors for the particular maintenance task for various time windows. The preferred time window may be but is not necessarily a currently-assigned time window for the particular maintenance task.

Additionally or alternatively, a preference for assigning a particular maintenance task to a preferred time window may be indicated in a data model using a CP construct, such as a soft constraint. A CP construct may be used to limit search to a time window nearest to the preferred time window. A CP construct may cause time windows to be sorted based on distances between each time window and the preferred time window. Hence, a CP construct may guide the CP solver 132 to perform a preference-based search.

Figure 4:
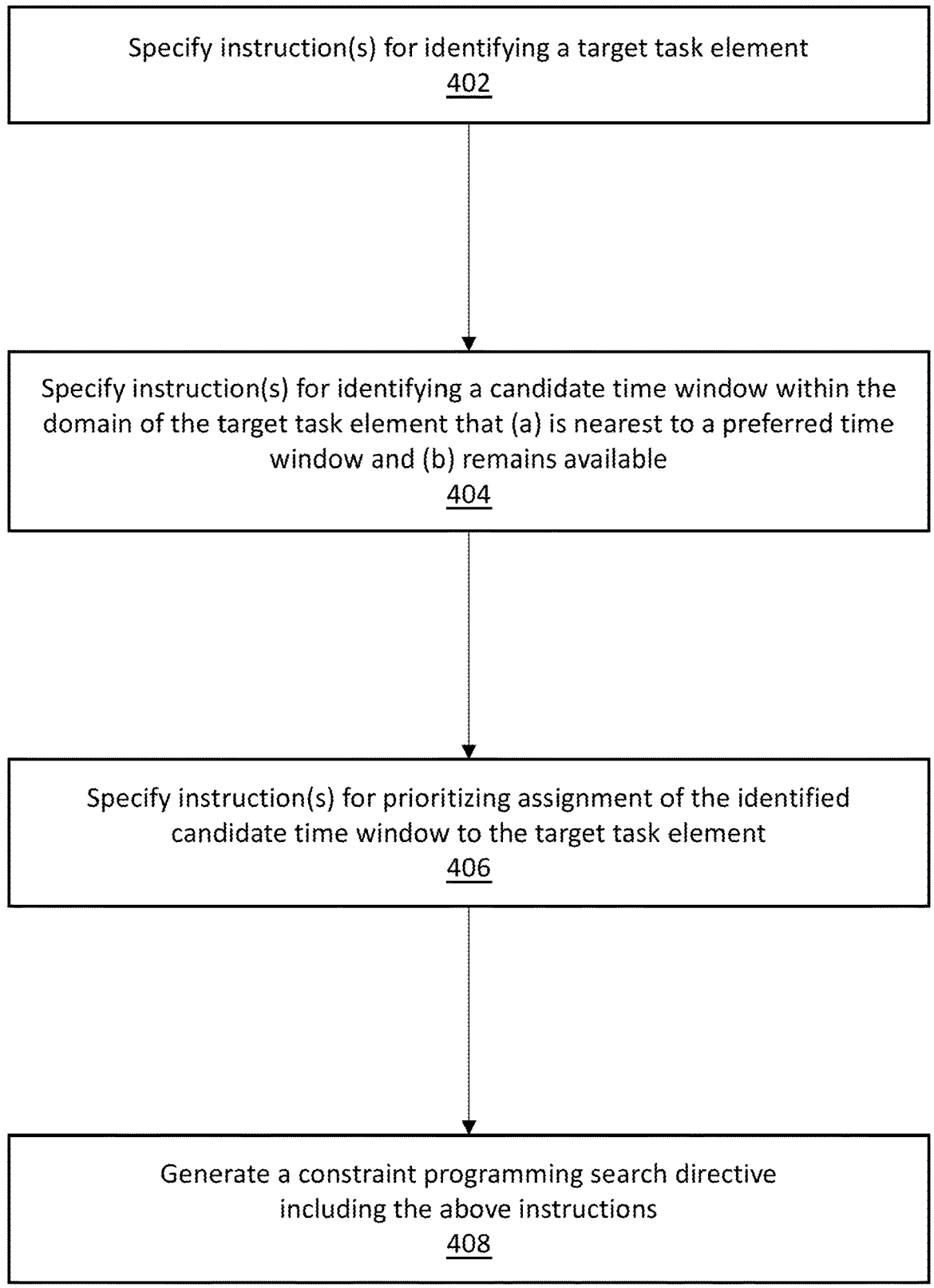
FIG. 4 illustrates an example set of operations for generating a constraint programming search directive, in accordance with one or more embodiments.

Additionally or alternatively, a preference for assigning a particular maintenance task to a preferred time window may be indicated in a search directive, as further described below. FIG. 4 illustrates an example set of operations for generating a constraint programming search directive, in accordance with one or more embodiments.

One or more embodiments include specifying one or more instructions for identifying a target task element (Operation 402). A search directive generator 116 determines, specifies, and/or obtains instructions and/or operations for traversing each of the set of task elements specified at Operation 302. The instructions include selecting a particular task element, representing a particular maintenance task, as an initial "target task element." In subsequent iterations, traversing the set of task elements, another task element may be selected as the "target task element."

One or more embodiments include specifying one or more instructions for identifying a candidate time window within the domain of the target task element that (a) is nearest to a preferred time window and (b) remains available (Operation 404).

In an embodiment, the search directive generator 116 uses a difference variable to track a distance from the preferred time window. The search directive generator 116 specifies instructions and/or operations that initially set the difference variable to a difference value of zero. The difference value is incremented with each iteration for traversing the set of task elements.

The search directive generator 116 specifies instructions and/or operations for identifying a candidate earlier time window and a candidate later time window. The candidate earlier time window is e number of time windows before the preferred time window, wherein e equals the difference value. The candidate later time window is l number of time windows after the current time window, wherein l equals the difference value. Initially, the difference value may be set to zero. In this case, both the candidate earlier time window and the candidate later time window are equal to the current time window.

As an example, a set of candidate time windows may include Monday, Tuesday, Wednesday, Thursday, and Friday. A preferred time window for a maintenance task may be Wednesday. Initially, a difference value may be 0. Then a candidate earlier time window is 0 time windows before the current time window. Hence, the candidate earlier time window is Wednesday. Similarly, a candidate later time window is 0 time windows after the current time window. Hence, the candidate later time window is also Wednesday. In subsequent iterations, the difference value may be incremented.

The search directive generator 116 specifies instructions and/or operations for determining whether both the candidate earlier time window and the candidate later time window are unavailable for being assigned to the target task element. Whether a time window is available for assignment depends on (a) a domain of the target task element, and/or (b) current task counts for the set of time elements.

In an embodiment, a domain of a task element is updated based on task counts for the set of time elements. When a maximum task count for a particular time element is reached, the time window represented by the particular time element is removed from domains of the task elements. Hence, a time window is available for assignment if the time window currently remains in the domain of the target task element.

In another embodiment, a domain of a task element is not updated based on task counts for the set of time elements. Hence, a time window is available for assignment if (a) the time window is in the domain of the target task element and (b) a maximum task count for the time element representing the time window has not yet been reached.

The search directive generator 116 specifies instructions and/or operations to be performed responsive to determining that both the candidate earlier time window and the candidate later time window are unavailable for being assigned to the target task element. The operations indicate incrementing the difference value, identifying a new candidate earlier time window and new candidate later time window, and iterating the process of determining whether both the candidate earlier time window and the candidate later time window are unavailable.

As an example, a search directive generator may specify instructions that use a difference variable for keeping track of the difference between the candidate time window being attempted and a preferred time window. The instructions may include initializing the difference variable to zero; determining whether at least one of a candidate earlier time window and a candidate later time window, both of which have a distance from the preferred time window equal to the current value of the difference variable, is available; and a loop that increments the difference variable if neither the candidate earlier time window nor the candidate later time window is available.

One or more embodiments include specifying one or more instructions for prioritizing assignment of a particular time window, of the candidate earlier time window and the candidate later time window, that is available for assignment to the target task element (Operation 406). The search directive generator 116 determines, specifies, and/or obtains instructions and/or operations for prioritizing assignment of a particular time window, of the candidate earlier time window and the candidate later time window, available for assignment to the target task element, if at least one of the candidate earlier time window and the candidate later time window is available. If the candidate earlier time window is available for performing the target maintenance task, and the candidate later time window is not available for performing the target maintenance task, then the candidate earlier time window is prioritized. If the candidate earlier time window is not available for performing the target maintenance task, and the candidate later time window is available for performing the target maintenance task, then the candidate later time window is prioritized. If both the candidate earlier time window and the candidate later time window are available for performing the target maintenance task, then any of the candidate earlier time window or the candidate later time window is prioritized. Whether to prioritize the candidate earlier time window or the candidate later time window may be determined randomly. Additionally or alternatively, whether to prioritize the candidate earlier time window or the candidate later time window may be determined based on a rule and/or a function. As an example, a user may desire to prioritize the candidate earlier time window whenever possible. Hence, if both the candidate earlier time window and the candidate later time window are available for performing the target maintenance task, then the candidate earlier time window is prioritized.

Prioritizing assignment of the particular time window to the target maintenance task may include attempting to assign the particular time window to the target maintenance task before attempting other time windows. The particular time window is hence preliminarily assigned to the target maintenance task. As further described below with reference to FIG. 5, a CP solver 132 may backtrack on preliminary assignments as necessary. Alternatively, the CP solver 132 may finalize preliminary assignments upon finding a CP solution that satisfies all constraints.

As an example, a preferred time window for a target maintenance task may be 12 pm-1 pm. A candidate earlier time window may be 11 am-12 pm. A candidate later time window may be 1 pm-2 pm. The candidate earlier time window may be available for performing the target maintenance task. The candidate later time window is not available for performing the target maintenance task. A search directive generator may determine instructions which prioritize assignment of the candidate earlier time window, over other time windows that have not yet been attempted for the target maintenance task, to the target task element representing the target maintenance task.

One or more embodiments include generating a CP search directive including the above instructions (Operation 408). The search directive generator 116 generates a CP search directive including the above instructions. The above instructions in the CP search directive are iterated for each of the task elements; hence a different task element is identified as the "target task element" for each iteration. The CP search directive may be stored as a software data structure. The CP search directive may include one or more arrays, vectors, linked lists, tables, software variables, constants, and/or data objects. The CP search directive may include a set of instructions executable by one or more devices including a hardware processor.

Figure 5:
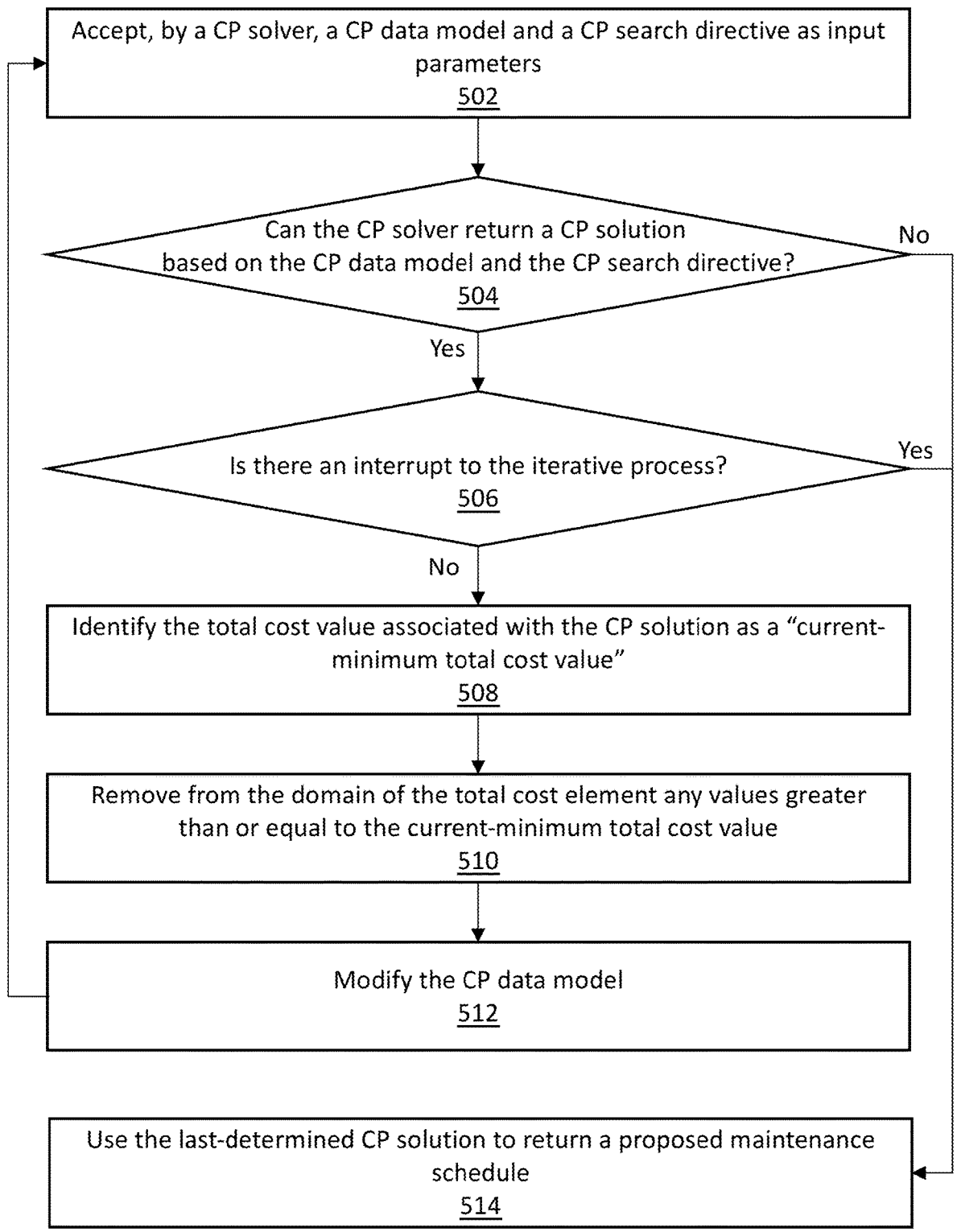
FIG. 5 illustrates an example set of operations applying a constraint programming data model and search directive to a constraint programming solver, in accordance with one or more embodiments.

D. Applying a Constraint Programming Data Model and Search Directive to a Constraint Programming Solver FIG. 5 illustrates an example set of operations applying a constraint programming data model and search directive to a constraint programming solver, in accordance with one or more embodiments. The CP data model and search directive are iteratively applied to determine a CP solution associated with a total cost element assigned with a lowest total cost value (as compared with other possible CP solutions).

One or more embodiments include accepting, by a CP solver, a CP data model and a CP search directive as input parameters (Operation 502). A CP solver 132 accepts a CP data model and a CP search directive as input parameters. Examples of operations for generating the CP data model are described above with reference to FIGS. 3A-B. Examples of operations for generating the CP search directive are described above with reference to FIG. 4.

One or more embodiments include determining whether the CP solver can return a CP solution based on the CP data model and the CP search directive (Operation 504). The CP solver 132 applies one or more constraint programming techniques to the CP data model, guided by the CP search directive. The CP solver 132 determines a CP solution based on the CP data model and the CP search directive, or determines that no CP solution that satisfies all hard constraints of the CP data model exists.

As an example, a CP solver may traverse each of a set of task elements specified by a CP data model to determine a CP solution. The CP solver may begin with a particular task element. A value from the domain of the particular task element is preliminarily assigned to the particular task element. If this preliminary assignment violates a constraint specified by the CP data model, then another value from the domain of the particular task element is preliminarily assigned to the particular task element. If all values from the domain of the particular task element are attempted and do not satisfy the constraint, then re-assignment of one or more task elements previously traversed is performed. In particular, a value from the domain of a previously-traversed task element was preliminarily assigned to the previously-traversed task element. Based on the need for re-assignment, another value from the domain of the previously-traversed task element is now preliminarily assigned to the previously-traversed task element. Then, assignment of the particular task element is re-attempted.

Additionally, the CP solver may be guided by a CP search directive. The CP search directive may determine a sequence in which time windows are attempted for assignment to one or more task elements. If assignment of Time Window A to a particular maintenance task is attempted before Time Window B, and a valid CP solution is found, then the assignment of Time Window A is finalized, regardless of whether assignment of Time Window B would have arrived at a valid CP solution. Hence, assignment of Time Window A is prioritized over Time Window B.

Hence, the CP solver may traverse each task element, until each task element is assigned a time window from the respective domain, without violating the constraints. The CP solver may determine the preliminary assignments as final assignments. The final assignments constitute a CP solution.

Alternatively, the CP solver may traverse each task element, until assignment of each time window to the task elements is attempted, and yet none of the assignments satisfy the constraints. Then, the CP solver may determine that there is no valid CP solution for the CP data model. The CP solver may return a message indicating that no CP solution exists.

In an embodiment, the CP solver 132 updates domains of data model elements as the CP solver 132 traverses and assigns values to the data model elements. The CP solver 132 removes values from domains that are no longer possible, given the preliminary assignments made thus far. The CP solver 132 removes values from the domains that would violate any hard constraints in the data model.

As an example, a CP solver may update a domain of a task element based on task counts for a set of time elements. When a maximum task count for a particular time element is reached, a particular time window represented by the particular time element may be removed from all domains of the task elements. Hence, as the CP solver traverses a next task element, assignment of the particular time window to the next task element is not possible.

In an embodiment, certain time window restrictions are used. The CP solver 132 updates domains of data model elements, while traversing through the data model elements, based on the time window restrictions.

As an example, a time window restriction may require that certain task elements be assigned with a same time window. A CP solver may make a preliminary assignment of a particular time window to one task element. Then the CP solver removes from the domain of the other task element all time windows except the particular time window. Hence, the only possible time window available for assignment is the particular time window. Both task elements would be assigned to the same time window.

As another example, a time window restriction may require that certain task elements be assigned with different time windows. A CP solver may make a preliminary assignment of a particular time window to one task element. Then the CP solver removes the particular time window from the domain of the other task element. Hence, the particular time window is not available for being assigned to the other task element. The two task elements would be assigned different time windows.

As another example, a time window restriction may require that certain task elements be assigned with a particular sequence of time windows-a time window assigned to T[i] must be before a time window assigned to T[j]. A CP solver may make a preliminary assignment of a particular time window to T[i]. Then the CP solver removes, from the domain of T[j], (a) the particular time window, and (b) all time windows that are before the particular time window. Hence, the only possible time windows for assigning to T[j] are after the particular time window. Alternatively, a CP solver may make a preliminary assignment of a particular time window to T[j]. Then the CP solver removes, from the domain of T[i], (a) the particular time window, and (b) all time windows that are after the particular time window. Hence, the only possible time windows for assigning to T[i] are before the particular time window.

If no CP solution is returned, then one or more embodiments include using the last-determined CP solution to return a proposed maintenance schedule (Operation 514). Since no CP solution is returned in the current iteration, the CP solver 132 retrieves the CP solution returned in the last iteration. The CP solver 132 identifies the CP solution from the last iteration as the last-determined CP solution. The CP solver 132 also identifies the CP solution from the last iteration as the CP solution associated with the lowest total cost value (compared to other CP solutions based on the data model generated at Operation 324).

Based on the last-determined CP solution, the CP solver 132 determines whether any task elements are assigned with the overflow time window. Maintenance tasks represented by task elements assigned with the overflow time window are not included in the proposed maintenance schedule. For the remaining task elements, the CP solver 132 determines the time window assigned to each task element. Based on assignment of a time window to a task element, the CP solver 132 returns a proposed maintenance schedule indicating that the maintenance task represented by the task element is scheduled for performance during the assigned time window.

If a CP solution is returned, then one or more embodiments include determining whether an interrupt to the iterative process has been received (Operation 506). As illustrated, Operations 502-512 form an iterative process for finding a CP solution associated with a lowest total cost value. A user and/or an application may interrupt the iterative process. As an example, a user may indicate via a user interface that the user desires a best CP solution determined thus far, without waiting for the iterative process to complete.

If an interrupt is received, then one or more embodiments include using the last-determined CP solution to return a proposed maintenance schedule (Operation 514). Since a CP solution is returned in the current iteration, the CP solver 132 identifies the CP solution from the current iteration as the last-determined CP solution. Examples of operations for determining a proposed maintenance schedule based on a CP solution are described above with reference to Operation 514.

The last-determined CP solution is not necessarily the CP solution associated with the lowest total cost value. A request to resume the iterative process for determining the CP solution associated with the lowest total cost value may be received. In response to the resumption request, the iterative process may continue at Operation 508.

If an interrupt is not received, then one or more embodiments include identifying the total cost value associated with the CP solution as a "current-minimum total cost value" (Operation 508). The CP solver 132 identifies the total cost value assigned to the total cost element associated with the CP solution obtained at Operation 504. The total cost value is identified as a "current-minimum total cost value."

One or more embodiments include removing, from the domain of the total cost element, any values greater than or equal to the current-minimum total cost value (Operation 510). The CP solver 132 uses the current-minimum total cost value as an upper bound on the possible total cost values to be assigned to the total cost element during a next iteration. The CP solver 132 removes, from the domain of the total cost element, any values greater than or equal to the current-minimum total cost value.

As an example, during a current iteration, the CP solver may return a current CP solution. The current CP solution may indicate that the total cost element is assigned with a total cost value of 450. The CP solver may determine 450 as the current-minimum total cost value. The CP solver may determine that a current domain of the total cost element is 1100, 200, 300, 450, 20001. The CP solver may remove, from the domain of the total cost element, any total cost values greater than or equal to 450. Hence, the CP solver may modify the domain of the total cost element to become {100, 200, 300}.

One or more embodiments include modifying the CP data model (Operation 512). The CP solver 132 modifies the CP data model to include the total cost element with the reduced domain. Based on Operation 510, the domain of the total cost element includes only total cost values that are below the current-minimum total cost value.

The CP solver 132 iterates Operations 502-512 with respect to the modified CP data model. At Operation 502, the CP solver 132 accepts the CP data model that has been modified as an input parameter. At Operations 504-508, assuming that the CP solver 132 determines a new CP solution based on the modified CP data model, the CP solver 132 updates the current-minimum total cost value. The CP solver 132 identifies a total cost value assigned to the total cost element associated with the new CP solution as the current-minimum total cost value. At Operation 510, the CP solver 132 removes, from the domain of the total cost element, any values greater than or equal to the current-minimum total cost value. At Operation 512, the CP solver 132 once again modifies the CP data model. The CP solver 132 continues the iterative process until the CP solver cannot find a CP solution at Operation 504, or an interrupt is received at Operation 506. As described above with reference to Operation 514, when the CP 132 solver cannot find a CP solution at Operation 504, or an interrupt is received at Operation 506, the CP solver 132 uses the last-determined CP solution to return a proposed maintenance schedule.

In one or more embodiments, additional and/or alternative operations for applying a constraint programming data model and search directive to a constraint programming solver may be performed, examples of which are described below.

In an embodiment, before a first application of the CP data model to the CP solver 132 at Operation 502, the CP data model is modified. A particular value within the range of possible total cost values, in the domain of the total cost element, is determined as an initial cutoff value. The initial cutoff value may be, for example, a median of the possible total cost values. All values above the initial cutoff value are removed from the domain of the total cost element. Hence, a first run of the CP solver 132 is required to generate a CP solution with a total cost value below the initial cutoff value. By setting the initial cutoff value, the CP solver 132 may more efficiently arrive at a CP solution with a lower total cost value, if a valid CP solution exists.

In an embodiment, the CP solver 132 iterates until all possible CP solutions, for the data model generated at Operation 324, are found. The CP solver 132 does not modify the domain of the total cost element based on a prior iteration. Hence, the CP solver 132 may find a CP solution with a higher total cost value than a prior CP solution. After determining all possible CP solutions, the CP solver 132 compares the total cost values associated with each possible CP solution. The CP solver 132 then identifies the CP solution with the lowest total cost value.

In an embodiment, multiple CP solutions may be associated with a same lowest total cost value. The iterative process may be modified to determine such CP solutions. At Operation 510, remove from the domain of the total cost element any values greater than the current-minimum total cost value (but keep any value equal to the current-minimum total cost value). At Operation 504, the CP solver attempts to find a CP solution that has not yet been found. If no further CP solutions can be found, then at Operation 514, the set of last-determined CP solutions with the same total cost value are identified. One CP solution is selected from the set of last-determined CP solutions with the same total cost value. Any selection criteria may be used. As an example, a CP solver may determine a difference between (a) each proposed maintenance schedule generated from each of the set of last-determined CP solutions and (b) the current maintenance schedule. The proposed maintenance schedule with the least difference is selected. As another example, a CP solver may determine a number of task elements assigned with an overflow time window in each of the set of last-determined CP solutions. A CP solution with the lowest number of tasks elements assigned with the overflow time window may be selected. The selected CP solution may be used to generate a proposed maintenance schedule.

Figure 6:
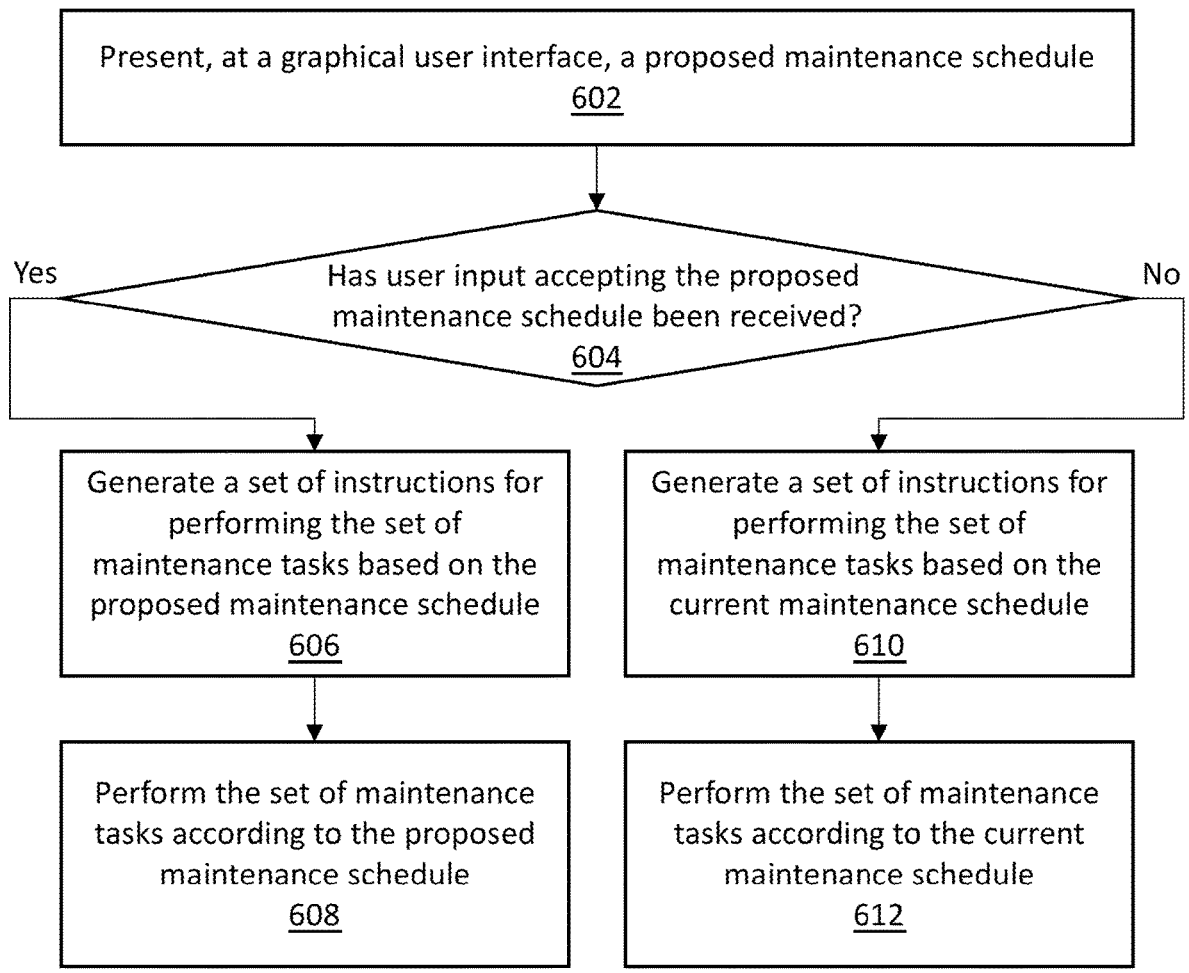
FIG. 6 illustrates an example set of operations for presenting and executing a proposed maintenance schedule, in accordance with one or more embodiments.

FIG. 6 illustrates an example set of operations for presenting and executing a proposed maintenance schedule, in accordance with one or more embodiments.

One or more embodiments include presenting, at a graphical user interface (GUI), a proposed maintenance schedule (Operation 602). A GUI 138 presents the proposed maintenance schedule determined at Operation 514. The GUI 138 may overlay the proposed maintenance schedule over a current maintenance schedule. An example GUI overlaying a proposed maintenance schedule on of a current maintenance schedule is described below with reference to FIG. 7B.

One or more embodiments include determining whether user input accepting the proposed maintenance schedule has been received (Operation 604). The GUI 138 presents an interface element configured to receive user input accepting, rejecting, and/or modifying the proposed maintenance schedule. The GUI 138 determines whether any such user input has been received via the interface element.

In one or more embodiments, user input accepting the proposed maintenance schedule is not necessary. The proposed maintenance schedule output from the CP solver is adopted without human intervention.

If user input has accepted the proposed maintenance schedule, one or more embodiments include generating a set of instructions for performing the set of maintenance tasks based on the proposed maintenance schedule (Operation 606). A set of instructions for performing the set of maintenance tasks based on the proposed maintenance schedule is generated.

In an embodiment, instructions for performing each maintenance task is obtained from a data repository. Additional instructions are determined, specified, and/or obtained for scheduling execution of the instructions for performing each maintenance task according to the proposed maintenance schedule. The instructions are executable by at least one device including a hardware processor.

As an example, a first maintenance task may be to update Software X on Server X. The first maintenance task is implemented by a set of instructions that loads and installs Software X updates on Server X. A second maintenance task may be to update Software Y on Server Y. The second maintenance task is implemented by a set of instructions that loads and installs Software Y updates on Server Y.

A master server may obtain a proposed maintenance schedule from a CP solver. The proposed maintenance schedule may indicate that the first maintenance task is scheduled for 9 am and the second maintenance task is scheduled for 10 am. Based on the proposed maintenance schedule, the master server may generate instructions for performing the first maintenance task and the second maintenance task according to the proposed maintenance schedule. The master server may generate instructions to execute the instructions of the first maintenance task (loading and installing Software X updates on Server X) at 9 am. The master server may generate instructions to execute the instructions of the second maintenance task (loading and installing Software Y updates on Server Y) at 10 am.

One or more embodiments include performing the set of maintenance tasks according to the proposed maintenance schedule (Operation 608). One or more maintenance resources accept the set of instructions generated at Operation 606. Based on the set of instructions, the maintenance resources perform the set of maintenance tasks according to the proposed maintenance schedule.

As an example, a proposed maintenance schedule may indicate that a first maintenance task is scheduled for 9 am and a second maintenance task is scheduled for 10 am. A master server may generate instructions for performing the first maintenance task at 9 am and the second maintenance task at 10 am. The master server may execute the instructions. According to the instructions, the master server may perform the first maintenance task at 9 am and the second maintenance task at 10 am.

As another example, a proposed maintenance schedule may indicate that a first maintenance task is scheduled for 9 am and a second maintenance task is scheduled for 10 am. A group of workers may view the proposed maintenance schedule at a GUI. Based on the proposed maintenance schedule, a worker may determine to perform the first maintenance task at 9 am. Another worker may determine to perform the second maintenance task at 10 am.

If user input has not accepted the proposed maintenance schedule, one or more embodiments include generating a set of instructions for performing the set of maintenance tasks based on the current maintenance schedule (Operation 610). Examples for generating a set of instructions for performing maintenance tasks based on a schedule are described above with reference to Operation 606.

One or more embodiments include performing the set of maintenance tasks according to the current maintenance schedule (Operation 612). Examples for performing the set of maintenance tasks according to a schedule are described above with reference to Operation 608.

4. Graphical User Interface for Presenting a Proposed Maintenance Schedule

Example GUIs are described below for purposes of clarity. Components and/or operations described below should be understood as specific examples which may not be applicable to certain embodiments. Accordingly, unless specifically indicated, components and/or operations described below should not be construed as limiting the scope of any of the claims.

Figure 7A:
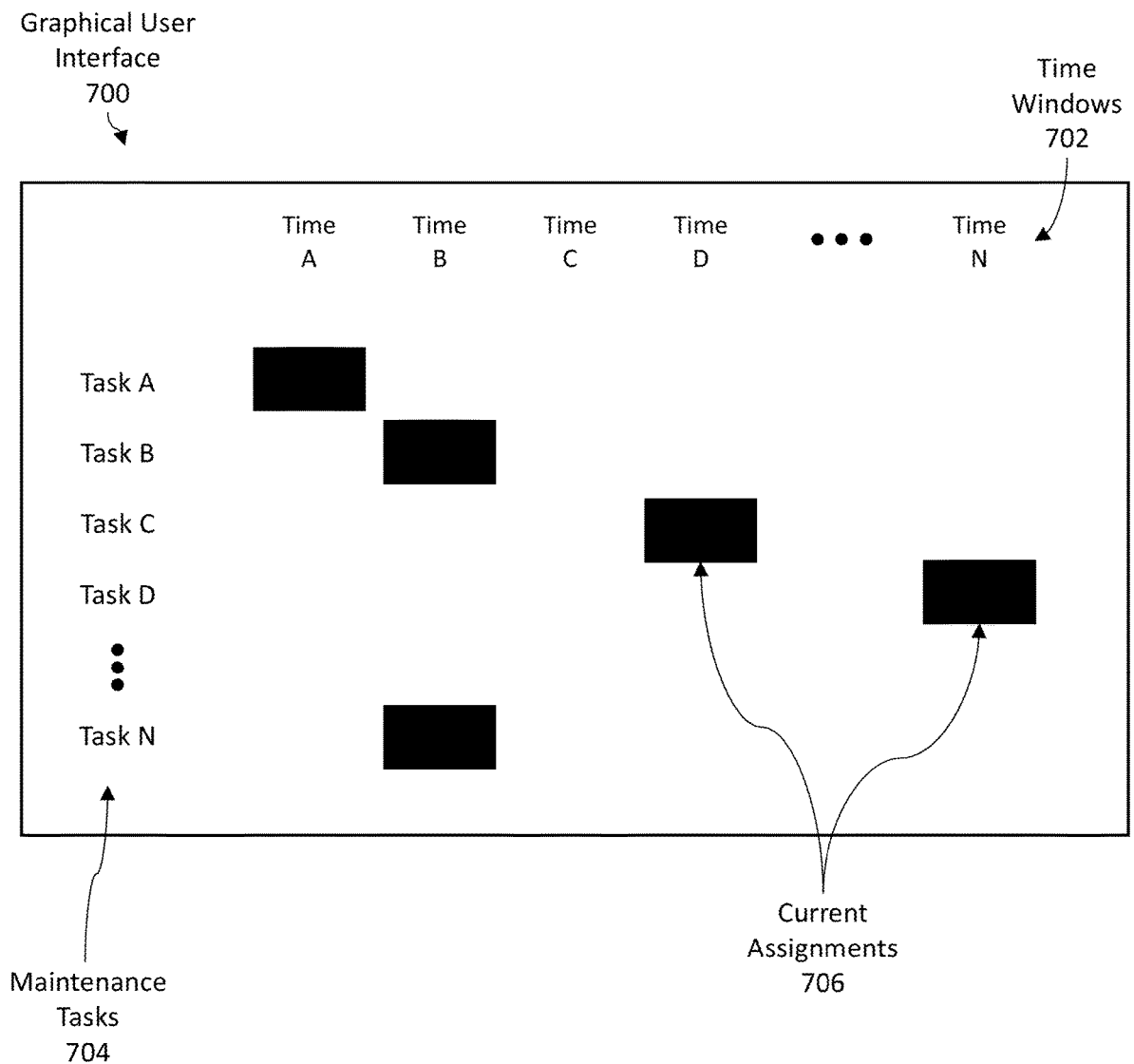
FIG. 7A illustrates an example graphical user interface indicating a current maintenance schedule for performing a set of maintenance tasks, in accordance with one or more embodiments.

FIG. 7A illustrates an example graphical user interface indicating a current maintenance schedule for performing a set of maintenance tasks, in accordance with one or more embodiments.

As illustrated, a GUI 700 presents a current maintenance schedule. The GUI 700 presents a current maintenance schedule in table form. Time windows 702 are represented by the columns of the table. Maintenance tasks 704 are presented by the rows of the table. As illustrated, time windows 702 include Time A, Time B, Time C, Time D, . . . Time N. Maintenance tasks 704 include Task A, Task B, Task C, Task D, . . . Task N.

The current maintenance schedule includes current assignments 706 of time windows 702 to maintenance task 704, as indicated by solid rectangles. Based on the current maintenance schedule, Time A is assigned to Task A. Time B is assigned to Task B and Task N. Time D is assigned to Task C. Time N is assigned to Task D.

In other embodiments, other graphics may be used to represent the current maintenance schedule and/or the current assignments.

Figure 7B:
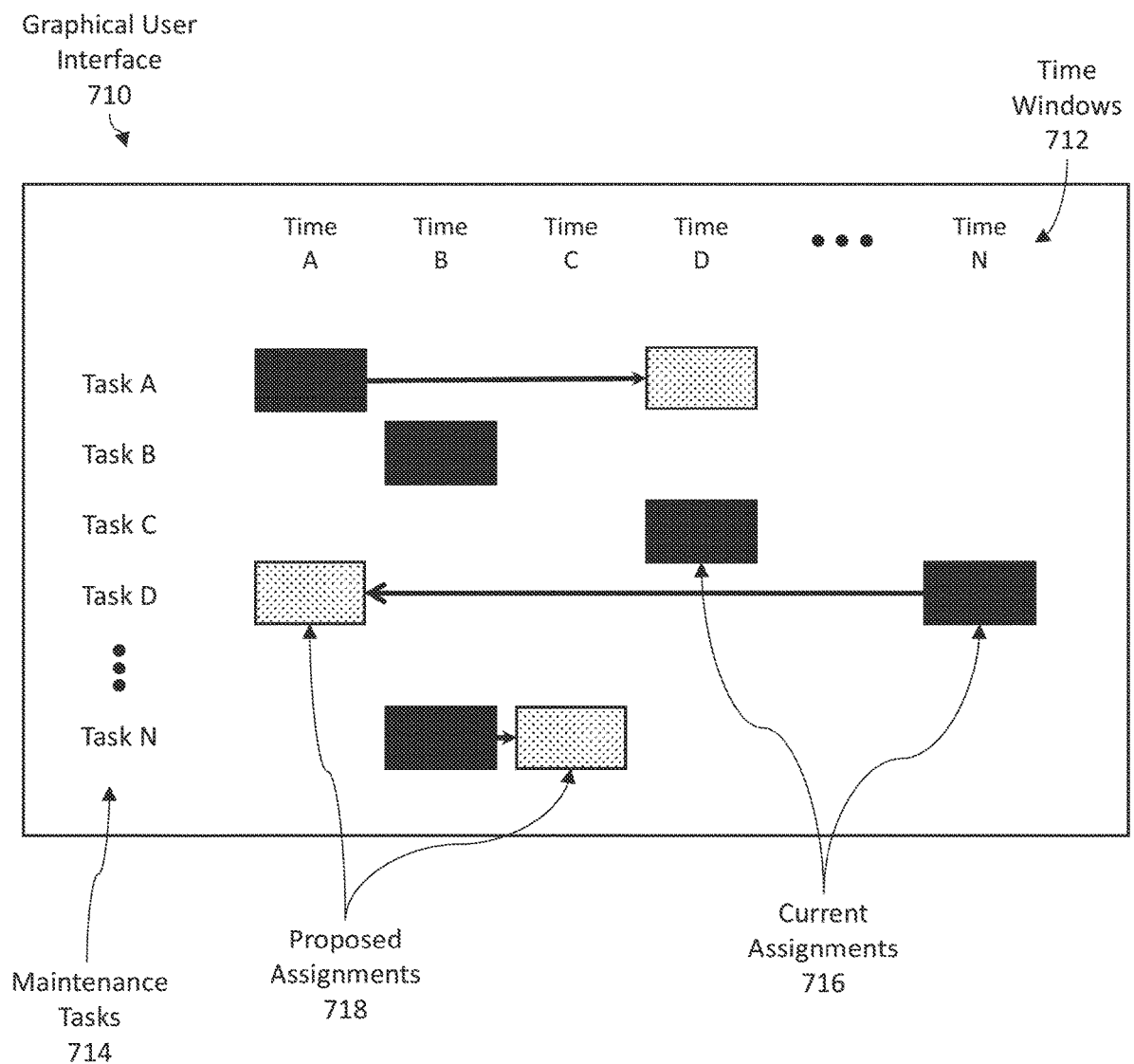
FIG. 7B illustrates an example graphical user interface overlaying a proposed maintenance schedule, on top of a current maintenance schedule, for performing a set of maintenance tasks, in accordance with one or more embodiments.

FIG. 7B illustrates an example graphical user interface overlaying a proposed maintenance schedule, on top of a current maintenance schedule, for performing a set of maintenance tasks, in accordance with one or more embodiments.

As illustrated, a GUI 710 presents a proposed maintenance schedule overlaid on a current maintenance schedule. The proposed maintenance schedule is determined by a CP solver based on a CP data model and a CP search directive. Time windows 712 are represented by the columns of the table. Maintenance tasks 714 are presented by the rows of the table. As illustrated, time windows 712 include Time A, Time B, Time C, Time D, . . . Time N. Maintenance tasks 714 include Task A, Task B, Task C, Task D, . . . Task N.

The current maintenance schedule includes current assignments 716 of time windows 712 to maintenance task 714, as indicated by solid rectangles. Based on the current maintenance schedule, Time A is assigned to Task A. Time B is assigned to Task B and Task N. Time D is assigned to Task C. Time N is assigned to Task D.

The proposed maintenance schedule includes proposed assignments 718 of time windows 712 to maintenance task 714, as indicated by dotted rectangles. If a dotted rectangle is not shown for a particular maintenance task, then the current assignment and the proposed assignment are the same for the particular maintenance task. Based on the proposed maintenance schedule, Time A is assigned to Task D. Time B is assigned to Task B. Time C is assigned to Task N. Time D is assigned to TaskA and Task C.

The GUI 710 presents arrows representing modifications from the current maintenance schedule to the proposed maintenance schedule. As illustrated, the time window for Task A is modified from Time A to Time D. The time window for Task D is modified from Time N to Time A. The time window for Task N is modified from Time B to Time C.

In other embodiments, other graphics may be used to represent the current maintenance schedule, the current assignments, the proposed maintenance schedule, and/or the proposed assignments.

Based on GUI 710, a user may easily view the modifications from the current maintenance schedule to the proposed maintenance schedule. Based on the modifications, the user may make necessary changes to implement the proposed maintenance schedule. As an example, the user may rearrange maintenance resources according to the proposed maintenance schedule.

5. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method, comprising:
    identifying a set of machine maintenance tasks to be performed for a set of machines;
    identifying a set of time windows for performing the set of machine maintenance tasks;
    identifying a set of cost values for performing the set of machine maintenance tasks during the set of time windows;
    generating a constraint programming data model, comprising:
        specifying a set of task elements representing the set of machine maintenance tasks;
            wherein a domain of a first task element, of the set of task elements, indicates possible time windows to be assigned to the first task element; and
            wherein the possible time windows includes at least a subset of the set of time windows;
        specifying a set of time elements representing at least the set of time windows;
            wherein a domain of a first time element, of the set of time elements, indicates possible task counts to be assigned to the first time element;
        specifying a set of cost elements corresponding to the set of task elements;
            wherein a domain of a first cost element, of the set of cost elements, indicates possible cost values to be assigned to the first cost element; and
            wherein the possible cost values includes at least a subset of the set of cost values;
        specifying a total cost element;
            wherein a domain of the total cost element indicates possible total cost values to be assigned to the total cost element;
        specifying a first constraint requiring at least that a first time window assigned to the first task element is one of the possible time windows, and a first task count assigned to the first time element is one of the possible task counts;
        specifying a second constraint requiring at least that the first cost element be assigned with a first cost value that is (a) one of the possible cost values and (b) is associated with performing a first machine maintenance task, represented by the first task element, during the first time window;
        specifying a third constraint requiring that the total cost element be assigned with a first total cost value that is (a) one of the possible total cost values and (b) is a sum of respective cost values assigned, or to be assigned, to the set of cost elements;

iteratively applying at least the constraint programming data model to a constraint programming solver to determine a set of one or more solutions satisfying at least the first constraint, the second constraint, and the third constraint, wherein the constraint programming solver is configured to computationally perform one or more of a backtracking algorithm or a forward-checking algorithm to determine the set of one or more solutions;

determining that, out of the set of solutions, a particular solution is associated with the total cost element that is assigned with a lowest total cost value;

returning a particular proposed machine maintenance schedule, for the set of machines, based on the particular solution, wherein at least a subset of the set of machine maintenance tasks is executed according to the particular proposed machine maintenance schedule;

wherein the method is performed by one or more devices, each including one or more hardware processors.

2. One or more non-transitory machine-readable media storing instructions which, when executed by one or more processors, cause:

identifying a set of machine maintenance tasks to be performed for a set of machines;

identifying a set of time windows for performing the set of machine maintenance tasks;

identifying a set of cost values for performing the set of machine maintenance tasks during the set of time windows;

generating a constraint programming data model, comprising:

specifying a set of task elements representing the set of machine maintenance tasks;

wherein a domain of a first task element, of the set of task elements, indicates possible time windows to be assigned to the first task element; and wherein the possible time windows includes at least a subset of the set of time windows;

specifying a set of time elements representing at least the set of time windows;

wherein a domain of a first time element, of the set of time elements, indicates possible task counts to be assigned to the first time element;

specifying a set of cost elements corresponding to the set of task elements;

wherein a domain of a first cost element, of the set of cost elements, indicates possible cost values to be assigned to the first cost element; and wherein the possible cost values includes at least a subset of the set of cost values;

specifying a total cost element;

wherein a domain of the total cost element indicates possible total cost values to be assigned to the total cost element;

specifying a first constraint requiring at least that a first time window assigned to the first task element is one of the possible time windows, and a first task count assigned to the first time element is one of the possible task counts;

specifying a second constraint requiring at least that the first cost element be assigned with a first cost value that is (a) one of the possible cost values and (b) is associated with performing a first machine maintenance task, represented by the first task element, during the first time window;

specifying a third constraint requiring that the total cost element be assigned with a first total cost value that is (a) one of the possible total cost values and (b) is a sum of respective cost values assigned, or to be assigned, to the set of cost elements;

iteratively applying at least the constraint programming data model to a constraint programming solver to determine a set of one or more solutions satisfying at least the first constraint, the second constraint, and the third constraint, wherein the constraint programming solver is configured to computationally perform one or more of a backtracking algorithm or a forward-checking algorithm to determine the set of one or more solutions;

determining that, out of the set of solutions, a particular solution is associated with the total cost element that is assigned with a lowest total cost value;

returning a particular proposed machine maintenance schedule, for the set of machines, based on the particular solution, wherein at least a subset of the set of machine maintenance tasks is executed according to the particular proposed machine maintenance schedule.

3. The one or more media of claim 2, wherein iteratively applying at least the constraint programming data model to the constraint programming solver to determine the set of solutions comprises:

applying at least the constraint programming data model to the constraint programming solver to applying at least the constraint programming data model to the constraint programming solver to determine a first solution of the set of solutions;

determining a first total cost value assigned to the total cost element associated with the first solution;

modifying the constraint programming data model, wherein modifying the constraint programming data model comprises:

removing, from the domain of the total cost element, any total cost values that are greater than or equal to the first total cost value;

applying at least the constraint programming data model that has been modified to the constraint programming solver to determine a second solution of the set of solutions;

wherein a second total cost value assigned to the total cost element associated with the second solution is less than the first total cost value.

4. The one or more media of claim 2, wherein:

iteratively applying at least the constraint programming data model to the constraint programming solver to determine the set of solutions comprises:

applying at least the constraint programming data model to the constraint programming solver to determine a first solution of the set of solutions;

determining a first total cost value assigned to the total cost element associated with the first solution;

modifying the constraint programming data model, wherein modifying the constraint programming data model comprises:

removing, from the domain of the total cost element, any total cost values that are greater than or equal to the first total cost value;

applying at least the constraint programming data model that has been modified to the constraint programming solver;

determining that no solution is possible for the constraint programming model that has been modified;
determining that, out of the set of solutions, the particular solution is associated with the total cost element that is assigned with the lowest total cost value comprises:
responsive to (a) determining that no solution is possible for the constraint programming model that has been modified and (b) determining that a last-determined solution, out of the set of solutions, is the first solution:
identifying the first solution as the particular solution associated with the total cost element that is assigned with the lowest total cost value.

5. The one or more media of claim 2, wherein iteratively applying at least the constraint programming data model to the constraint programming solver to determine the set of solutions comprises:
identifying a particular value between a lowest total cost value, out of the possible total cost values in the domain of the total cost element and a highest total cost value, out of the possible total cost values in the domain of the total cost element, as an initial cutoff value;
modifying the constraint programming model, wherein modifying the constraint programming model comprises:
removing, from the domain of the total cost element, any total cost values that are greater than or equal to the initial cutoff value;
applying at least the constraint programming model that has been modified to the constraint programming solver to determine a first solution of the set of solutions;
wherein a first total cost value assigned to the total cost element associated with the first solution is less than the initial cutoff value.

6. The one or more media of claim 2, wherein the set of solutions comprises all possible solutions for the constraint programming data model.

7. The one or more media of claim 2, wherein returning the particular proposed machine maintenance schedule is responsive to receiving an interrupt to an iterative process for minimizing the total cost element.

8. The one or more media of claim 7, further storing instructions which cause:
subsequent to returning the particular proposed machine maintenance schedule responsive to receiving the interrupt:
resuming iteratively applying at least the constraint programming data model to the constraint programming solver to determine a second solution;
wherein a first total cost value assigned to the total cost element associated with the particular solution is greater than a second total cost value assigned to the total cost element associated with the second solution;
returning a second proposed machine maintenance schedule based on the second solution.

9. The one or more media of claim 2, further storing instructions which cause:
determining a subset of the cost values that is associated with performing the first machine maintenance task on a first machine, of the set of machines, during the possible time windows based at least on a first machine attribute associated with the first machine.

10. The one or more media of claim 9, wherein the first machine attribute comprises one or more of: a failure probability of the first machine, and a production schedule of the first machine.

11. The one or more media of claim 9, wherein an effect on each of the subset of the set of cost values due to the first machine attribute is same.

12. The one or more media of claim 2, further storing instructions which cause:
determining a subset of the set of cost values that is associated with performing the first machine maintenance task during the possible time windows based at least on a first task attribute associated with the first machine maintenance task.

13. The one or more media of claim 12, wherein the first task attribute comprises one or more of:
a particular time window, of the set of time windows, assigned to the first machine maintenance task according to a current machine maintenance schedule; and
a time window restriction for the first machine maintenance task.

14. The one or more media of claim 2, further storing instructions which cause:
determining that a particular time window, of the set of time windows, is assigned to the first machine maintenance task according to a current machine maintenance schedule;
determining a first cost value for performing the first machine maintenance task during the first time window;
determining a second cost value for performing the first machine maintenance task during a second time window of the set of time windows;
wherein a first difference between the particular time window and the first time window is less than a second difference between the particular time window and the second time window;
wherein a first effect on the first cost value due to the first difference is less than a second effect on the second cost value due to the second difference.

15. The one or more media of claim 2, further storing instructions which cause:
generating a constraint programming search directive, comprising:
specifying one or more operations for prioritizing assignment of the first task element with a time window of the set of time windows that is (a) nearest to a particular time window assigned to the first machine maintenance task according to a current maintenance schedule and (b) remains available.

16. The one or more media of claim 2, wherein generating the constraint programming data model further comprises:
specifying a fourth constraint requiring that the first time window assigned to the first task element be before a second time window assigned to a second task element of the set of task elements.

17. The one or more media of claim 2, wherein generating the constraint programming data model further comprises one of:
specifying a fourth constraint requiring that the first time window assigned to the first task element and a second time window assigned to a second task element of the set of task elements be same; or
specifying a fifth constraint requiring that the first time window assigned to the first task element and a second time window assigned to a second task element of the set of task elements be different.

18. The one or more media of claim 2, wherein generating the constraint programming data model further comprises:

specifying a soft constraint indicating a preference for assigning a time window of the set of time windows to the first task element that is nearest to a particular time window.

19. The one or more media of claim 2, wherein:
the possible time windows further includes an overflow time window, wherein any of the set of task elements assigned with the overflow time window is not performed according to the particular proposed maintenance schedule;
the possible cost values further includes an overflow cost value associated with the overflow time window, wherein the overflow cost value is greater than each of the set of cost values.

20. The one or more media of claim 2, further storing instructions which, when executed by the one or more processors, cause:
generating a set of instructions which, when executed by a second set of one or more hardware processors, cause performance of at least a subset of the set of machine maintenance tasks according to the particular proposed machine maintenance schedule.

21. The one or more media of claim 2, further storing instructions which, when executed by the one or more processors, cause:
presenting, at a graphical user interface (GUI), a current machine maintenance schedule for performing at least a subset of the set of machine maintenance tasks;
overlaying the particular proposed machine maintenance schedule on top of the current machine maintenance schedule.

22. The one or more media of claim 2, wherein the particular proposed maintenance schedule indicates that the first machine maintenance task is scheduled for the first time window.

23. The one or more media of claim 2, further storing instructions which cause:
determining a subset of the cost values that is associated with performing the first machine maintenance task on a first machine, of the set of machines, during the possible time windows based at least on (a) a first machine attribute associated with the first machine, and (b) a first task attribute associated with the first machine maintenance task;
wherein the first machine attribute comprises one or more of: (a) a failure probability of the first machine, and (b) a production schedule of the first machine;
wherein the first task attribute comprises one or more of: (a) a particular time window, of the set of time windows, assigned to the first machine maintenance task according to a current machine maintenance schedule, and (b) a time window restriction for the first machine maintenance task;
generating a set of instructions which, when executed by a second set of one or more hardware processors, cause performance of at least a subset of the set of machine maintenance tasks according to the particular proposed machine maintenance schedule;
presenting, at a graphical user interface (GUI), a current machine maintenance schedule for performing at least a subset of the set of machine maintenance tasks;
overlaying the particular proposed machine maintenance schedule on top of the current machine maintenance schedule;
wherein:
generating the constraint programming data model further comprises one or more of:
specifying a fourth constraint requiring that the first time window assigned to the first task element be before a second time window assigned to a second task element of the set of task elements;
specifying a fifth constraint requiring that the first time window assigned to the first task element and a third time window assigned to a third task element of the set of task elements be same;
specifying a sixth constraint requiring that the first time window assigned to the first task element and a fourth time window assigned to a fourth task element of the set of task elements be different;
iteratively applying at least the constraint programming data model to the constraint programming solver to determine the set of solutions comprises:
identifying a particular value between a lowest total cost value, out of the possible total cost values in the domain of the total cost element and a highest total cost value, out of the possible total cost values in the domain of the total cost element, as an initial cutoff value;
modifying the constraint programming model, wherein modifying the constraint programming model comprises:
removing, from the domain of the total cost element, any total cost values that are greater than or equal to the initial cutoff value;
applying at least the constraint programming model, which has been modified to exclude any total cost values greater than or equal to the initial cutoff value from the domain of the total cost element, to the constraint programming solver to determine a first solution of the set of solutions;
responsive to receiving an interrupt: returning a temporary proposed machine maintenance schedule based on the first solution;
subsequent to receiving the interrupt:
determining a first total cost value assigned to the total cost element associated with the first solution, wherein the first total cost value assigned to the total cost element associated with the first solution is less than the initial cutoff value;
modifying the constraint programming data model, wherein modifying the constraint programming data model comprises:
removing, from the domain of the total cost element, any total cost values that are greater than or equal to the first total cost value;
applying at least the constraint programming data model, which has been modified to exclude any total cost values greater than or equal to the first total cost value from the domain of the total cost element, to the constraint programming solver to determine a second solution of the set of solutions;
determining a second total cost value assigned to the total cost element associated with the second solution, wherein the second total cost value is less than the first total cost value;
modifying the constraint programming data model, wherein modifying the constraint programming data model comprises:
removing, from the domain of the total cost element, any total cost values that are greater than or equal to the second total cost value;
applying at least the constraint programming data model, which has been modified to exclude any total cost values greater than or equal to the second total cost value from the domain of the total cost element, to the constraint programming solver;

determining that no solution is possible for the constraint programming model, which has been modified to exclude any total cost values greater than or equal to the second total cost value from the domain of the total cost element;

determining that, out of the set of solutions, the particular solution is associated with the total cost element that is assigned with the lowest total cost value comprises:

responsive to (a) determining that no solution is possible for the constraint programming model and (b) determining that a last-determined solution, out of the set of solutions, is the second solution:

identifying the second solution as the particular solution associated with the total cost element that is assigned with the lowest total cost value;

the particular proposed maintenance schedule indicates that the first machine maintenance task is scheduled for the first time window.

24. A system, comprising:

one or more devices, each including one or more hardware processors;

one or more non-transitory computer-readable media; and program instructions stored on the one or more non-transitory computer-readable media which, when executed by the one or more processors, cause the system to perform operations comprising:

identifying a set of machine maintenance tasks to be performed for a set of machines;

identifying a set of time windows for performing the set of machine maintenance tasks;

identifying a set of cost values for performing the set of machine maintenance tasks during the set of time windows;

generating a constraint programming data model, comprising:

specifying a set of task elements representing the set of machine maintenance tasks;

wherein a domain of a first task element, of the set of task elements, indicates possible time windows to be assigned to the first task element; and wherein the possible time windows includes at least a subset of the set of time windows;

specifying a set of time elements representing at least the set of time windows;

wherein a domain of a first time element, of the set of time elements, indicates possible task counts to be assigned to the first time element;

specifying a set of cost elements corresponding to the set of task elements;

wherein a domain of a first cost element, of the set of cost elements, indicates possible cost values to be assigned to the first cost element; and wherein the possible cost values includes at least a subset of the set of cost values;

specifying a total cost element;

wherein a domain of the total cost element indicates possible total cost values to be assigned to the total cost element;

specifying a first constraint requiring at least that a first time window assigned to the first task element is one of the possible time windows, and a first task count assigned to the first time element is one of the possible task counts;

specifying a second constraint requiring at least that the first cost element be assigned with a first cost value that is (a) one of the possible cost values and (b) is associated with performing a first machine maintenance task, represented by the first task element, during the first time window;

specifying a third constraint requiring that the total cost element be assigned with a first total cost value that is (a) one of the possible total cost values and (b) is a sum of respective cost values assigned, or to be assigned, to the set of cost elements;

iteratively applying at least the constraint programming data model to a constraint programming solver to determine a set of one or more solutions satisfying at least the first constraint, the second constraint, and the third constraint, wherein the constraint programming solver is configured to computationally perform one or more of a backtracking algorithm or a forward-checking algorithm to determine the set of one or more solutions;

determining that, out of the set of solutions, a particular solution is associated with the total cost element that is assigned with a lowest total cost value;

returning a particular proposed machine maintenance schedule, for the set of machines, based on the particular solution, wherein at least a subset of the set of machine maintenance tasks is executed according to the particular proposed machine maintenance schedule.

* * * * *

UNITED STATES PATENT AND TRADEMARK OFFICE
CERTIFICATE OF CORRECTION

PATENT NO. : 11,797,951 B2
APPLICATION NO. : 16/938290
DATED : October 24, 2023
INVENTOR(S) : Colena et al.

It is certified that error appears in the above-identified patent and that said Letters Patent is hereby corrected as shown below:

On the Title Page

On page 2, Column 2, under Other Publications, Line 24, delete "Contributi" and insert -- Contribution --, therefor.

In the Specification

In Column 5, Line 65, delete "Specification" and insert -- specification --, therefor.

In Column 6, Line 48, delete "learning" and insert -- learning. --, therefor.

In Column 11, Line 35, delete "6)." and insert -- 6}. --, therefor.

In Column 22, Line 24, delete "TaskA," and insert -- Task A, --, therefor.

In Column 29, Line 57, delete "1100," and insert -- {100, --, therefor.

In Column 29, Line 57, delete "20001." and insert -- 2000}. --, therefor.

In Column 33, Line 25, delete "TaskA" and insert -- Task A --, therefor.

In the Claims

In Column 38, Lines 31-33, in Claim 3, after "solver to" delete "applying at least the constraint programming data model to the constraint programming solver to".

Signed and Sealed this
Eleventh Day of June, 2024

Katherine Kelly Vidal
*Director of the United States Patent and Trademark Office*